(12) United States Patent
Patri et al.

(10) Patent No.: US 10,944,179 B2
(45) Date of Patent: Mar. 9, 2021

(54) DEVICES, SYSTEMS AND METHODS FOR CREATING AND DEMODULATING ORBITAL ANGULAR MOMENTUM IN ELECTROMAGNETIC WAVES AND SIGNALS

(71) Applicant: The Research Foundation for SUNY, Albany, NY (US)

(72) Inventors: Ashutosh Patri, Balasore (IN); Patanjali V. Parimi, Liverpool, NY (US); Michael Kolacki, Oswego, NY (US)

( * ) Notice: Subject to any disclaimer, the term of this patent is extended or adjusted under 35 U.S.C. 154(b) by 255 days.

(21) Appl. No.: 15/944,791

(22) Filed: Apr. 4, 2018

(65) Prior Publication Data

US 2018/0287262 A1 Oct. 4, 2018

Related U.S. Application Data

(60) Provisional application No. 62/481,119, filed on Apr. 4, 2017.

(51) Int. Cl.
*H01Q 15/10* (2006.01)
*H01Q 15/02* (2006.01)
*H01Q 13/02* (2006.01)
*G02B 5/00* (2006.01)
*B82Y 20/00* (2011.01)

(52) U.S. Cl.
CPC .............. *H01Q 15/02* (2013.01); *G02B 5/00* (2013.01); *H01Q 13/02* (2013.01); *H01Q 15/10* (2013.01); *B82Y 20/00* (2013.01)

(58) Field of Classification Search
CPC ........ H01Q 13/02; H01Q 15/02; H01Q 15/10; B82Y 20/00; G02B 5/3038
USPC ....................................................... 343/909
See application file for complete search history.

(56) References Cited

U.S. PATENT DOCUMENTS

| 6,693,605 | B1 * | 2/2004 | Crouch | H01Q 15/24 343/909 |
| 7,777,690 | B2 * | 8/2010 | Winsor | H01Q 15/08 343/911 R |
| 2010/0255274 | A1 * | 10/2010 | Mirsky | C25D 11/04 428/209 |

(Continued)

*Primary Examiner* — Awat M Salih
(74) *Attorney, Agent, or Firm* — Garrett Smith; Michael Krenicky; Steven A. Wood, Jr.

(57) ABSTRACT

Orbital angular momentum (OAM) communications systems provide an additional degree of freedom to the electromagnetic waves that travel between the transmission and receiving stations, thereby enabling a dramatic increase in data transmission rates. The present invention provides a design for a very low reflectivity flat spiral phase plate that generates OAM modes and a method of making the same. The design incorporates variable sizes of perforated unit cells and may include matched layers to provide improved impedance matching, and the flat disc shape makes the phase plate compact and easy to install. The OAM phase plate can be designed to operate at frequencies from a few 100s KHz to ultraviolet frequencies and is capable of providing one or more OAM modes at the operational frequencies, irrespective of polarization. In a preferred embodiment, the OAM phase plate is designed for operation at about 30 GHz frequency, with 20 GHz bandwidth.

20 Claims, 16 Drawing Sheets

(56) References Cited

U.S. PATENT DOCUMENTS

| | | | |
|---|---|---|---|
| 2016/0111781 A1* | 4/2016 | Matteoni | G02B 27/286 |
| | | | 343/911 R |
| 2017/0230115 A1* | 8/2017 | Ashrafi | H04B 10/2504 |
| 2017/0346257 A1* | 11/2017 | Garnache-Creuillot | ........ |
| | | | H01S 5/14 |
| 2018/0269577 A1* | 9/2018 | Kosaka | H01Q 19/17 |

* cited by examiner

DEVICES, SYSTEMS AND METHODS FOR CREATING AND DEMODULATING ORBITAL ANGULAR MOMENTUM IN ELECTROMAGNETIC WAVES AND SIGNALS

RELATED APPLICATIONS

This application claims priority to U.S. Provisional Application No. 62/481,119, filed Apr. 4, 2017 and entitled DEVICES, SYSTEMS AND METHODS FOR CREATING AND DEMODULATING ORBITAL ANGULAR MOMENTUM IN ELECTROMAGNETIC WAVES AND SIGNALS.

BACKGROUND

1. Field

One or more aspects of the present invention relate to the transmission and reception of data using beams of electromagnetic waves, and more particularly to devices, systems and methods for transmitting data with photons in different states of orbital angular momentum (OAM). Specifically, this application for patent discloses and claims an arrangement of transmitting and receiving antennas, modulators and filters as well as radio, optical or other free space connections employing such arrangements, and also related methods of modulating, demodulating and multiplexing signals across such systems.

2. Description of Related Art

The demand for higher data rates and secure communications has been constantly increasing with the proliferation of mobile electronic gadgets, emerging multimedia applications, requirement for high resolution tactical military and commercial weather and geographical radar imaging, big data of biomedical body worn vital sign monitoring sensors, and many other internet of the things (IoT), device to device and machine to machine data sharing applications.

Due to this demand wireless communication systems face serious challenges to improve data transmission as the allowed spectrum and signal polarization are limited even after adopting high density coding and channel sharing techniques. Currently, fifth generation 5G mobile communications standards, protocols and technologies are being developed essentially to enhance upon the existing 4G data rates.

Employing free space electromagnetic (EM) waves and signals such as free space microwave (MW) or radio frequency (RF) waves is common in various communications and data transmissions applications. Free space optics (FSO) is a telecommunication technology that uses an optical beam or pulse in free space to transmit data between two points.

Similarly, phased antenna arrays can be used for beam-forming and beam steering of Optical, RF and MW frequency beams, with similar characteristics to FSO. Data transmitted via these systems can be any information that is desired to be sent from a transmitter to a receiver.

Free space optical communication systems provide a number of advantages over lower frequency wireless communication systems, such as transmission at higher data rates and reduced ability for eavesdropping or interception of data. Further, FSO does not currently require licensing and distribution of bandwidth.

However, FSO also suffers from several major drawbacks, including absorption of the laser beam by the intervening medium and also the effects of random and uncontrolled atmospheric turbulence or distortions, aberrations or other perturbations upon the optical beam wavefront. These effects are undesirable as they result in variations in the beam intensity profile, degradation of the signal, inaccuracies in the receiving station and reduced throughput of the communications channel.

Free space EM beam communications may also fail to protect privacy if when confidential data are transmitted by a sender to an intended recipient and a third party is capable of intercepting the EM beam and decoding the confidential data.

In attempting to overcome the identified drawbacks and to create a robust system with a very large information carrying capability, many important developments have been created in the area of free space communications. Novel techniques need to be developed for utilizing microwave and millimeter-wave bands with very high efficiency. In this regard, orbital angular momentum (OAM) has recently drawn attention for wireless communications. It has been known for some time that the electromagnetic waves can carry both linear and angular momenta.

The recognition in the 1990s that light beams with a helical phase front have orbital angular momentum (OAM) has beneficial applications ranging from optical manipulation to quantum information processing. OAM based communications have been shown to provide an additional degree of freedom to the EM waves sent from transmitters to receivers useful to enable the delivery of data in various OAM modes at a given operation frequency and thereby dramatically increasing the data capacity of free space communications. Consequently, attentions have focused on opportunities to harness this property of OAM beams in telecommunications.

Angular momentum, sometimes described as the rotational analogue of linear momentum, is one of the most fundamental physical quantities in both classical and quantum mechanics and can be divided into spin angular momentum (SAM) and orbital angular momentum (OAM) in paraxial beams.

SAM is associated with two possible polarization modes of electromagnetic beams, i.e., the left and right circularly polarized modes and linearly polarized mode. However, these modes can only offer limited channels in a communication system. Intrinsic photon spin angular momentum is manifested as circular polarization, as anticipated by Poynting in 1909 and demonstrated by Beth in 1936.

In contrast, OAM is linked to the spatial distribution of the beam cross-section and relates to spiral beam vorticity and phase singularity. It was shown by Allen in 1992 that helically phased beams comprising an azimuthal phase term $\exp(i\ell\theta)$, have an OAM of $\ell\hbar$ per photon (where $\ell$ is topological charge, $\theta$ is azimuthal angle, and $\hbar$ is Plank's constant h divided by $2\pi$).

An OAM modulated beam is generated by a transformation of planar or spherical EM waves, e.g., by applying phase correction to a propagating beam using a plate phase shifter. In the OAM modulated beam the orbital phase of the beam varies in the azimuth plane, orthogonal to the direction of the beam.

OAM is a natural property of various types of helically phased beams, ranging from electron beams to radio waves and it has resulted in many developments in optical manipulation, optical trapping, optical tweezers, optical vortex knots, imaging, astronomy and quantum information processing. In addition to these established areas, OAM has recently seen applications in free space data transmissions and communications.

And, multiplexing using orbital angular momentum (OAM) modes has recently attracted much attention due to the high data rates of transmission. Since OAM modes are spatially orthogonal, they can be used to multiplex data transmissions at the same frequency, increasing channel capacity and spectrum use efficiency. Multiplexing and frequency reuse by OAM modes has been successfully demonstrated at optical frequencies for short range communications (A. E. Willner, et al., "Optical communications using orbital angular momentum beams", Adv. Opt. Photon. vol. 7, pp, 66-106 (2015)). Thus, The OAM modulation and consequent high data rate transmission is of significant interest at radio, microwave and mm-wave communications.

Especially, an experiment conducted by Wang, et al., in 2012 showed that a more than 1 Tbps free space data communication link can be achieved by employing orbital angular momentum multiplexing in the optical domain. This proved that OAM can be used as a new degree of freedom to improve the spectral efficiency of telecommunications.

Furthermore, in the conventional RF, MW or FSO communication systems previously discussed it may be advantageous to send data with low error rates without using more power than necessary. For a single conventional channel of a certain bandwidth, the data rate possible at a given error rate increases only logarithmically with the signal to noise ratio.

Consequently, if a system with one channel is transmitting enough power to achieve a good signal to noise ratio, it may be more power-efficient to increase the bandwidth of the channel, or to add channels, than to increase the power in the existing channel. Increasing the bandwidth of the channel may in some cases, however, face technical obstacles.

In contrast to SAM, which has only two possible values of $\pm\hbar$, the theoretically unlimited values of $\ell$, in principle, provide an infinite range of possibly achievable OAM states. Since each of the states of OAM are mutually orthogonal to each other, they can offer an additional rotational degree of freedom in communication, which can be used as new set of communication channels without increasing the frequency bandwidth.

OAM therefore has the potential to tremendously increase the data capacity of communication systems, either by encoding information as OAM states of the beam or by using OAM beams as information carriers for multiplexing. However, the generation of OAM modulated beams at millimeter wave frequencies is challenging due to both noise caused by the interference of propagating waves having different phases and issues with manufacturing. Devices including spiral phase plates (Peter Schemmel, et al., "Modular spiral phase plate design for orbital angular momentum generation at millimetre wavelengths", Opt. Express OSA, vol. 22, pp. 14712-14726 (2014)), spiral reflectors (Byun, W. et al. "Simple generation of orbital angular momentum modes with azimuthally deformed Cassegrain subreflector". Electron. Lett. vol. 51, pp. 14801482 (2015)), twisted parabolic reflectors (Fabrizio Tamburini, et al., "Encoding many channels on the same frequency through radio vorticity: first experimental test", New Journal of Physics, vol. 14, no. 3 (2012)), and perforated horns (X. Bai, et al. "Design of a horn lens antenna for OAM generation", IEEE International Symposium on Antennas and Propagation USNC/URSI National Radio Science Meeting, pp. 2081-2082 (2015)), have been used in the literature. Another possibility in microwave domain is by using circular phased array antennas (Spinello, F. et al. "Experimental near field OAM-based communication with circular patch array". arXiv preprint, arXiv: 1507.06889 (2015)).

Use of OAM beams for multiplexing can be regarded as the analogue of various other multiplexing technologies at optical, infrared, millimeter-wave, microwave, and radio frequency communications, such as wavelength-division multiplexing (WDM), time-division multiplexing (TDM), polarization-division multiplexing (PDM), spatial-division multiplexing (SDM) and mode-division multiplexing (MDM).

Recent advances in optical communication systems in relation to multilevel amplitude/phase modulation formats, coherent detection and electronic digital signal processing have facilitated dramatic increases in capacity and spectral efficiency. Therefore, a valuable goal would be to use OAM beams to carry information with multilevel amplitude/phase modulation formats, resulting in yet another increase of capacity and spectral efficiency, gained by the multiplexing of OAM beams. Moreover, when using OAM beams to carry different data information, a potentially desirable operation for flexible data processing would be data exchange between OAM beams.

Existing passive components for OAM based devices includes parabolic reflectors, thickness varied spiral phase plate and planar spiral phase plate. However, these aforementioned components generally lack the compactness, flat surfaces, perfect impedance matching and ease of manufacturing, and the latter component is narrow band, difficult to fabricate and results in OAM mode distortion.

In a previous design by Uchida, et al., for electron beams with orbital angular momentum, the thickness of a spiral phase plate (SPP) increased in proportion to the azimuthal angle around the center of the SPP. When the incident plane wave goes through the SPP, the electromagnetic wave will be imprinted on a total phase shift of $2\pi\ell$ over the full circle. However, this design leads to bulky OAM phase plate.

Further, previously developed planar phase plates typically require many different layers or require holes of different diameters, each of which make manufacture more challenging. In addition, for the non-planar spiral phase plate having abrupt surfaces of different heights or thicknesses, this results in a bulkier phase plate device.

There are at least 15 OAM patented designs for telecommunications devices that generate OAM EM wave modes for increasing transmission data rates.

Reference is made to a U.S. patent application, publication no. US20160315395A1, which discloses an OAM mode electromagnetic wave generator based on a subreflector and a main reflector. Both the reflectors used are metallic and work on reflective principle, which has the disadvantages of off-set feed and source blockage. The system is also not compact and the manufacturing process of parabolic reflectors is not economical.

Reference is also made to an application, publication no. US20150029070A1, which discloses a reflecting or transmitting dielectric slab depending upon their purpose of use. The dielectric slab has a variable height with an increasing or decreasing order of step function which provides the required phase variation. The proposed component is not flat and is not compact.

Reference is made to an international application, publication no. WO2005069443A1, which discloses a parabolic reflector deformed axially to generate a desired OAM mode. The reflector is a metallic and progressively deformed plate which has the same disadvantages of off-set feed and source blocking. The system is not compact and the manufacturing process of such reflectors is costly.

Reference is also made to a Chinese patent application, serial no. CN105206900A, which discloses a transmission array made of multiple layers of dielectric thin sheet and different sizes of metallic patches fabricated over them in a special fashion to obtain OAM modulation from a spherical phase front. The size of metallic patches are optimized to have lower transmission loss and required phase for each unit cell corresponding to their position in the transmit array. The proposed design is flat and compact but provides a highly distorted phase and due to the use of metallic patches the loss factor is high.

Reference is made to an international patent application, publication no. WO2013092470A1, which discloses various apparatuses required for a long range OAM based communication system and includes parabolic reflectors specially made to handle OAM modes which are expensive and bulky.

Reference is also made to a Chinese patent application, serial no. CN104319434A, which discloses a novel technique to obtain both ultra-low reflectivity and OAM mode from a dielectric spiral phase plate. The patent solves the matching issues by choosing a perfect combination of dielectric thickness and perforation diameter for each sector of the plate. It is expensive and time consuming to fabricate such a device with different hole diameters. Another drawback of the design lies with the abrupt stepped surface, which is bulky and undesirable.

Reference is also made to a Chinese patent application, serial no. CN105680162A, which discloses a reflective element array made using square patches to provide required phase shift to the incoming wave for generating the OAM modulated wave to be transmitted in different directions simultaneously. The use of metallic patches introduces ohmic losses and phase distortion is also an issue.

Reference is made to a U.S. patent application, publication no. US20150194735A1, which discloses a parabolic metallic reflector with a varied diameter in the axial direction. The drawbacks for this invention are common to the parabolic and metallic antennas discussed above.

Reference is also made to a Chinese patent application, serial no. CN105978840A, which discloses a rotating dielectric phase plate with an increasing or decreasing thickness throughout the spiral to generate an OAM beam. The proposed component is not flat and not compact. Matching issues are not addressed in this patent and it is also mechanized with moving parts that may fail or are prone to mechanical error.

Reference is made to a Chinese patent application, serial no. CN105977630A, which discloses a very thin transmit array in which each element or unit cell is designed using multiple layers of dielectric and metallic patches. Generally, there are 4 dielectric layers and 5 metallic patch layers. The metallic patches are divided into two types i.e. annular ring slot and UC-PBG and by controlling the design parameters of the aforementioned patches, desired phase and coupling can be achieved for a particular frequency to generate OAM wave. This patent is very similar to CN105206900A, having the same drawbacks as discussed for that application.

Reference is also made to a European patent application, serial no. EP3035456A1, which discloses components used to make a laser device that could carry orbital angular momentum. Though this patent is mainly focused for optical frequency or laser frequency, one of its components is based on perforation method to achieve variable refractive index required for OAM phase front generation. The perforation is made on a two-dimensional sub-wavelength grating made of single $Si_3N_4$ layer and the perforated layer act as a metamaterial in which the properties can be manipulated by varying the diameter of perforated air holes. This patent application contemplates constant unit-cell size with varying diameter of the perforated holes and does not include impedance matched layers.

Reference is also made to a Chinese patent application, serial no. CN204031182U, which discloses nano-photonic dielectric meta-surface reflector cavity resonators to generate chip-scale orbital angular momentum beams for optical frequencies. To achieve the phase control, various shapes of dielectric resonators are chosen to obtain required phase variation and low loss. The whole meta-surface array is based on silicon on insulator platform. The proposed concept is confined solely to optical frequencies.

Reference is made to a U.S. patent application, publication no. US20160111781A1, which discloses the design principle of two types of lenses that could be used to generate OAM mode beams. These are meta-materials with predetermined refractive index which incorporates split ring resonators and tunable meta-material with reconfigurable refractive properties to enable the use of different frequencies to generate OAM modes. The use of meta-material with split ring resonators and use of lumped element to tune reconfigurable meta-materials results in ohmic losses to the OAM lens and the operation frequency band will be minimal for the first kind of lens. In the case of the tunable meta-material lens, phase distortion may occur due to multiple lumped elements present in the vicinity of the lens.

Reference is also made to a Korean patent application, serial no. KR101163367B1, which discloses an optical grating in which the phase delay information of the respective liquid crystal cells act as a spatial light modulator to generate an OAM mode beam. A spatial light modulator has an embodied form on a plurality of liquid crystal cells in a two-dimensional array space. The liquid crystal cell has a transparent electrode that has a dielectric anisotropy and optical anisotropy surrounding the liquid crystal, corresponding to the applied voltage, which operates as a polarizer. The working principle of such device is totally different from all of the other references discussed.

Reference is also made to a U.S. Pat. No. 6,084,552A, which discloses a spiral phase plate which has one planar surface and one spiral surface to form one period of a helix, with a step discontinuity. The various spiral of a constant refractive index provides required phase front for OAM beam due to the spiral thickness. The drawbacks of the component have already been addressed while describing the patent CN105978840A.

Spiral phase plates for inducing orbital angular momentum into optical beams have been known at least since 1994 when Beijersbergen, et al., published their seminal articles on producing helical wave front laser beams with spiral phase plates. However, many of these inventions just discussed utilize meta-materials, usually including metallic patches that create distortion, losses and narrow bandwidth. In addition, many of these inventions employ complicated methods of manufacture and the resulting devices are either bulky, not compact or non-planar. Lastly, several of the similar devices utilize a completely different method for generating orbital angular momentum beams.

In order to increase the data content in the beam, OAM states of an EM beam may be used to transmit and encode data in a power-efficient and privacy protecting manner. However, such EM beams, especially laser beams at optical frequencies carrying multiple OAM states, can be severely affected by the presence of aberrations in the medium through which they travel.

Data security is another key aspect of wireless communications. Physical layer (PHY) security approaches have been proposed to improve the secrecy levels of communication systems. These approaches mainly rely on beamforming and artificial noise (AN) techniques to address secrecy problems. One of the recent methods is secure communication is based on quantum key distribution (QKD).

Quantum mechanical procedures are then used to transmit this key from the sender to the receiver. The original demonstration of QKD made use of the polarization of light to encode information onto an individual photon, and thus each photon could carry only one bit of information.

In contrast, there remains a need to develop a system in which information is encoded onto individual photons (single frequency) using multiple states of orbital angular momenta. Because there is no limit to how much OAM a single photon or wave at a given frequency can carry, there is in principle no limit to how much information can be carried by individual photons/waves in a QKD and other secure transmission systems.

Further, there also remains a need for an OAM free space communications system that has an ultra-wide bandwidth that is inherently less susceptible to disturbances. Such disturbances include wavefront distortions and intensity fluctuations introduced by the atmosphere. Such a system would support better and faster communication of data, even in the presence of atmospheric distortions.

A majority of the research on OAM and its applications is confined to visible frequencies. Only a few research investigations in the wireless frequency range have been reported so far. However, because OAM is a natural physical property of EM waves, it can be utilized for a wide variety of radio, microwave and millimeter-wave applications, which are more robust against the causes of typical atmospheric aberrations.

The demand for more advanced tactical equipment has increased as older equipment require a large number of vehicles to transport, which limits their deployment flexibility. Furthermore, the bandwidth within which this equipment operates is unable to adequately meet the demand for modern network enabled applications. Consequently there remains a need for telecommunications devices and systems that can address the technical challenges that constrain this field, including the challenges of limited bandwidth, secure communications and the need for seamless connectivity.

SUMMARY

The following summary presents a simplified synopsis of the invention in order to provide a basic understanding of some aspects of the invention. This summary is not intended to identify all critical elements or delineate the entire scope of the invention nor is it intended to set forth all essential features or limit in any way the scope of the claimed subject matter. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The present invention is useful in many telecommunications sectors, including without limitation: satellite telecommunications, tactical communications, and commercial telecommunications. This invention comprises a very low reflectivity impedance matched flat phase plate (FPP) configured to generate OAM wave modes and a method of making the same. This invention provides an FPP that contains an array of perforated holes that collect EM energy from incoming EM waves and applies phase correction to the incident EM waves to create the OAM modulation.

Furthermore, the invention may have one or more layers, and in multiple layer configurations, top and bottom impedance matching layers minimize reflection energy losses and enable high efficiency generation of OAM modulated waves without phase distortion. The design incorporates variable sizes of perforated unit cells and may employ perforated or solid matched layers depending upon the requirement of accurate impedance matching, and the flat disc shape of the phase plate provides the advantage of being compact and easy to install.

The OAM FPP can be designed using the current concept to operate at frequency range within the EM spectrum, including without limitation 100s of KHz, radio, millimeter, microwave, visible and ultraviolet frequencies. The concept is also applicable across the EM spectrum, including X-Ray and Gamma-Ray frequencies, but current methods of manufacture are not capable of creating a device based the current concept and operable at those frequencies.

The FPP of the present invention is capable of providing one or more OAM modes at a particular signal frequency irrespective of the polarization. In a preferred embodiment, the OAM FPP is designed for operation at about 30 GHz frequency, with 20 GHz bandwidth.

Further, the FPP of the present invention is lightweight, compact, has flat surfaces on both sides, is easily fabricated, and cheaper for mass production than its counterpart conventional OAM components. The FPP may have single and multiple layers of impedance matching coatings capable and can generate OAM modulated waves with low loss and high efficiency. In addition, the complexity of is reduced by adopting a constant hole diameter for perforations made in the dielectric or other media.

In a preferred embodiment free space impedance matching is easily implemented for maximum efficiency and minimum losses. Only a single dielectric, magnetic, magneto-dielectric, metallo-magnetic, metallo-dielectric, metallo-dielectric-magnetic or metamaterial slab may be used.

The holes in the FPP can provide perfect impedance matching, without the need of multiple materials, to achieve OAM phase front and this is achieved without any off-axis source blockage.

The FPP of the present invention contains no metallic parts, eliminating any potential for ohmic losses. Thickness of the plate is constant and the diameter of perforation is constant, which will lead to rapid and easy manufacturing as well as generation of precise phase fronts. These characteristics are advantageous, especially as compared to conventional metallic parabolic reflectors.

The present invention is easy and inexpensive to manufacture, efficient and consequently has a greater potential for world-wide commercialization compared to the existing phase plates for OAM based communications systems. In addition, the proposed invention will be able to seamlessly improve high data rate communications, for example extend 4G communications data rates into data rate ranges anticipated for 5G, and thus allows for faster and efficient high data rate communication than the existing technologies. Further, this device could be retrofit onto existing telecommunications towers and stations.

The FPP of the present invention can also be used in the demodulation process of OAM modulated waves at the receiver. To achieve the required spiral phase distribution, variation of refractive index is required, which has been varied by modifying the permittivity of the dielectric material using perforations.

In addition, the array of holes can be made in such a way that the FPP can be used to generate diffractive as well as non-diffractive OAM beams as the output, with spherical or near spherical wave front, parallel wave front or any other shaped EM beams as input. Additional lenses are not necessary to focus the beam, e.g., for near-field scanning optical microscopy. Further, non-diffracting OAM beams decrease and mitigate interference between multiple OAM beams, reduce multiplexing errors, and improve OAM demodulation by reducing the need for back-end signal processing software.

BRIEF DESCRIPTION OF THE DRAWINGS

Non-limiting and non-exhaustive features will be described with reference to the following figures, wherein like reference numerals refer to like parts throughout the various figures. The figures below were not intended to be drawn to any precise scale with respect to size, angular relationship, or relative position.

FIG. 2A (top) shows light with right or left circular polarization vectors which carries a SAM of ±h per photon. FIG. 2A (bottom) shows a conventional wave front without orbital angular momentum, but which is carrying a SAM. FIG. 2B (top) shows polarization vectors for light with linear polarization (e.g., vertical), which carries no SAM. FIG. 2B (bottom) shows a single mode OAM helical wave front.

FIG. 3B is a photo of the OAM FPP fabricated using a dielectric material, with perforations made by drilling holes into the dielectric material.

DETAILED DESCRIPTION

Figure 1:
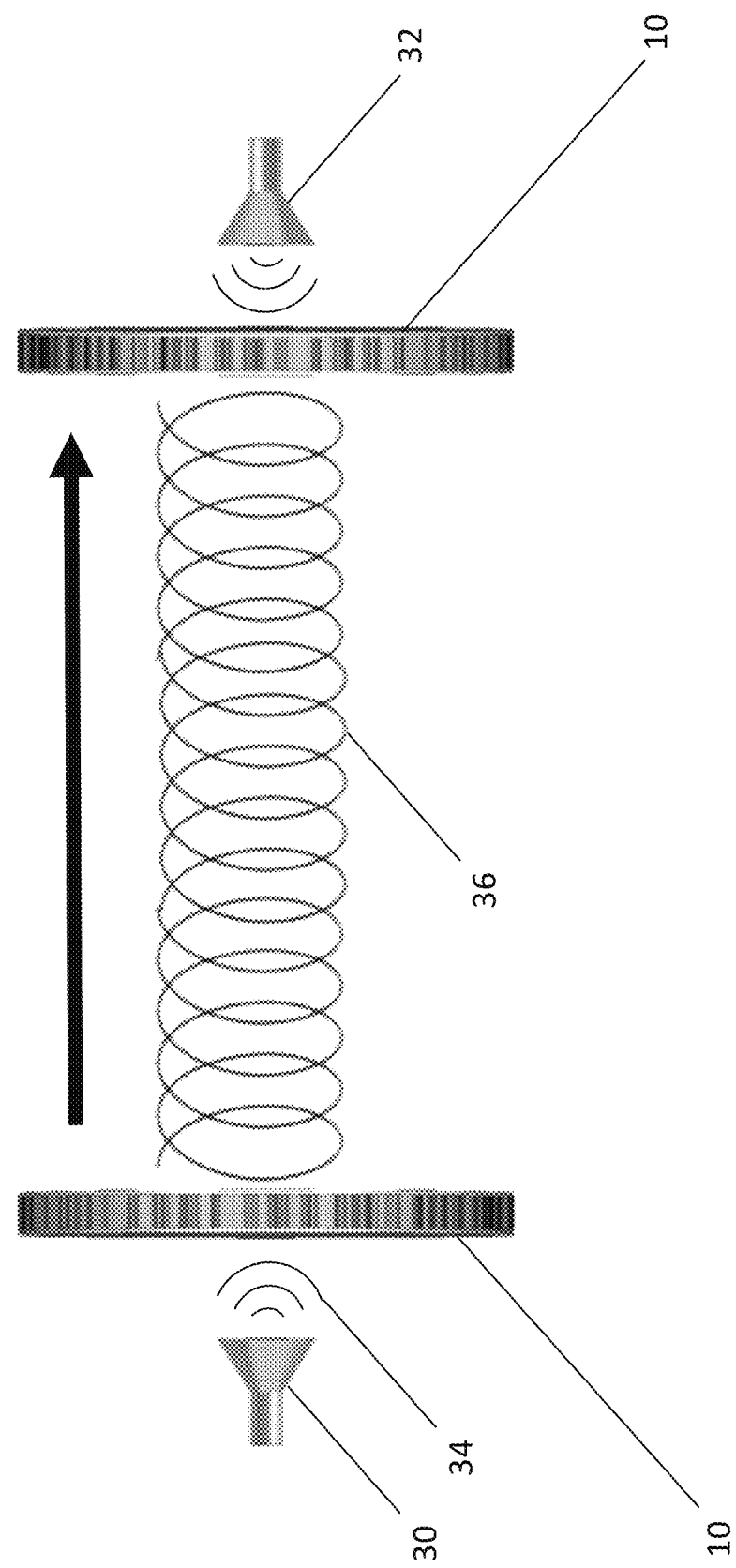
FIG. 1 depicts an OAM data transmission system with a transmitter, a linearly polarized horn antenna (on the left), a flat phase plate (FPP) OAM modulator, and a receiver and FPP OAM demodulator (on the right), employing a spiral OAM beam. The FPPs provide angular momentum modulation to the incoming beam and similarly to demodulation OAM on the receive side.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof and the invention includes all such modifications, such as, but not limited to, the use of this invention to generate and transmit Orbital Angular Momentum (OAM) electromagnetic (EM) waves.

OAM signals are of particular importance in telecommunications systems. OAM telecom systems include a transmitter system capable of generating and sending OAM modulated signals to a receiver system capable of demodulating the OAM signals to extract data. Other than communication, an OAM transmitter device can be used to generate various modes of OAM signals that could be used for various applications such as spectroscopy, EM tweezers etc.

Ever increasing proliferation of smart devices, introduction of new emerging multimedia applications, together with an exponential rise in wireless data demand and usage are already creating a significant burden on existing cellular networks. The next generation 5G wireless communications is being developed to provide high data rates (typically of Gbps order) and manifold increase to base station capacities, in addition to a few other benefits as compared to current 4G LTE networks. 5G development is essential because 4G cannot solve the data rate problems due to its limited bandwidth.

The present invention relates to the design and methods of fabrication of various passive components for OAM devices and systems and comprises a novel flat phase plate (FPP) configured to generate, modulate, transmit, receive and demodulate diffractive or non-diffractive OAM modulated EM wave modes and also a method for making the same. A corresponding FPP at a receiver station can be used to receive and demodulate such diffractive or non-diffractive OAM modulated EM signals.

Therefore, the present invention enables the creation of telecommunications systems in which information is encoded onto individual photons using the orbital angular momentum (OAM) states of waves. Because there is no limit to how much OAM a single photon or wave at a given frequency can carry, there is in principle no limit to how much information can be carried by individual photons/waves in a system.

Generally, an OAM device provides an extra degree of freedom to the electromagnetic wave, which enables to send or receive data in various OAM mode modulated for a single frequency, thus increasing the data rate. This will add an extra degree of freedom to the propagating EM wave front and the various modes of orbital angular momentum are orthogonal to each other and thus independent, which leads to theoretically infinite number of modulations possible for each frequency.

The present invention addresses two of the major problems in wireless communication, security and data rate transmission, with an innovative approach based on OAM modulation of EM waves. The approach to OAM modulation of wireless signals according to the present invention will significantly increase existing data rates of 4G networks and will increase the future 5G data rates by many fold.

This not only increases throughput efficiency but also increases the bandwidth accessible for high data rate communication systems as both lower 4G (0.9-4 GHz) and higher 5G (Ka, Q and V band (26.5-70 GHz) frequencies can be used for wireless systems. Novel OAM based modulation and associated secure high data rate communication technologies for transmission and reception at K, Q and V bands is an emerging technology.

Second, compression, encryption, encoding and modulation at the transmitter side and a reverse process at the receiver side are employed for secure wireless communications. Thus, the OAM modulation technique simultaneously provides two key advantages such as high data rate and security to the communication systems. Currently, two different devices or mechanisms are required to achieve these two separate goals. Encryption of data can be implemented using multiple and hybrid OAM modulation.

The device and system of the present invention is capable of imprinting as many as 4 or more bits of information using OAM, i.e., L=±(1, 2, 3, 4), at a given frequency. We have empirically and numerically tested OAM FPPs up to the order of four (quadruple mode OAM). We designed these OAM FPPs using perforated dielectric sections, with each section having a slightly different perforation or hole packing configuration. We have also demonstrated the generation of OAM modes using the aforementioned FPPs in a numerical experimental setup, as discussed in greater detail below.

Further, as depicted in FIG. 1, the OAM FPP 10 can be retrofitted as a component in the front end of the communication systems to modulate (at the transmitter 30) and demodulate (at the receiver 32) the wireless signals 36 without changing the underlying infrastructure of the existing communication systems. For example, the FPP of the present invention can be used in conjunction with conventional transmitter and receiver antennas, such as a horn antenna (FIGS. 1, 4B, 7B and 14), a parabolic reflector antenna, or a helical antenna.

This will enable rapid integration and deployment of the OAM FPP in existing communications systems ranging from commercial mobile and television to defense communications and radar systems, to medical wireless devices, to automobile transportation systems, to internet of the things (IoT) and many other secure high data throughput network applications.

Consequently, it is not necessary to change or modify existing wireless systems, infrastructure and networks to achieve secure high data throughput networks, which cost hundreds of billions of dollars to create. This adaptability will greatly enhance commercial adoption of the OAM FPP in different market sectors.

The FPP 10 of the present invention comprises a flat, low reflectivity, low loss and high efficiency phase plate capable of generating OAM modulated waves. Generally, a beam of EM waves such as light carries linear momentum irrespective of the polarization of field. Thus, the linear momentum could be attributed to an external angular momentum about a center or origin. To achieve the helicity or rotation/OAM around the axis of EM propagation, phase advancement or compensation is required.

Due to the self-propagating electric and magnetic field components, light and other EM waves carry a linear momentum equivalent to $h_{k0}$ per photon and, if circularly polarized, a spin angular momentum (SAM) of ±h per photon. In 1992, Allen et al. recognized that light beams with an azimuthal phase dependence of $e^{(i\ell\varphi)}$ carry an orbital angular momentum (OAM) that can be many times greater than the spin and that such beams were readily realizable.

Figure 2A:
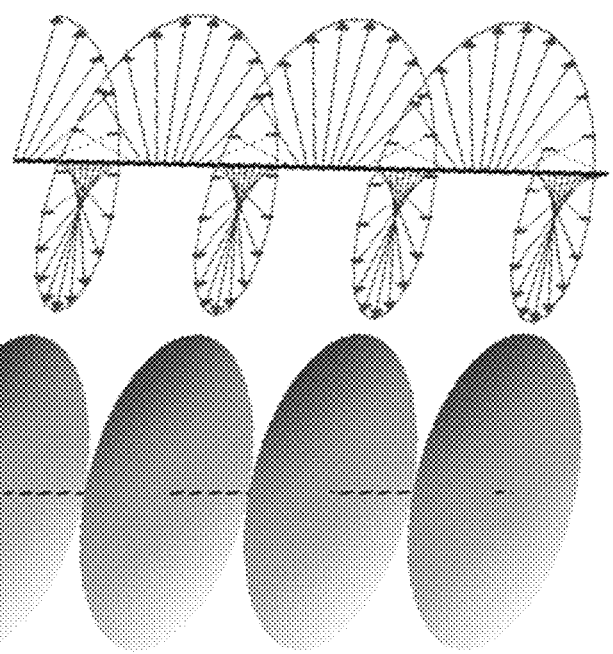
FIGS. 2A and 2B depict the spin angular momentum (SAM) of EM radiation that is connected to the polarization of the electric field and also the orbital angular momentum (OAM) of EM radiation that is connected to the wave front of the EM radiation field.
Figure 2B:
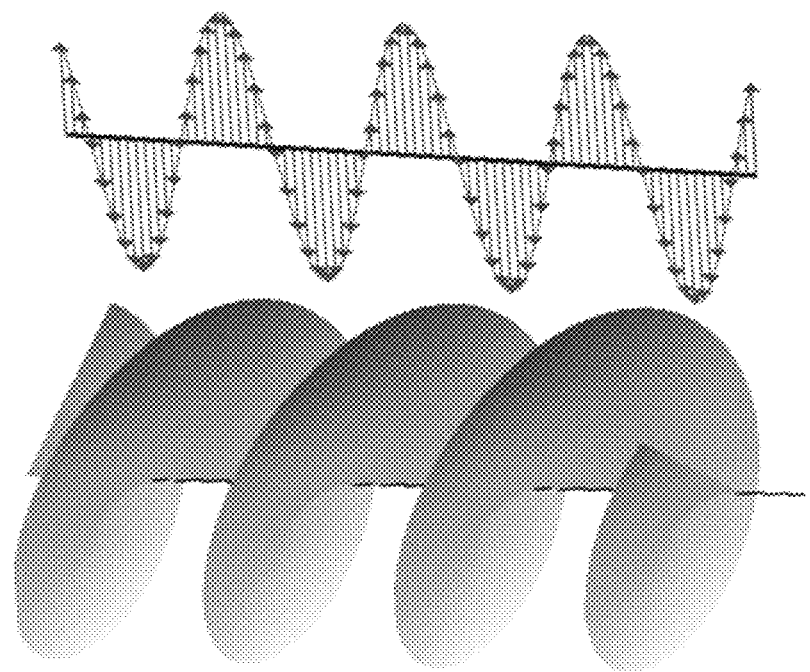

This OAM is completely distinct from the familiar SAM, most usually associated with the photon spin that is manifest as circular polarization (FIG. 2A). By producing a beam with gradually changing phase front in a plane transverse to the propagation direction, orbital angular momentum can be generated about a center or origin. The beam thus generated travels forward with a spiraling or helical OAM (FIG. 2B).

The FPP device generates OAM modulation by implementing a variation in the refractive index to manipulate the phase of an incoming EM wave. The variation in refractive index can be achieved by manipulating the electrical permittivity and magnetic permeability of a material. Varying these parameters, individually one at a time or both simultaneously, can implement the phase adjustment required to generate OAM modulation.

In one preferred embodiment, the variation of material permeability can also be achieved by incorporating inclusions within the base material, such as inclusions of material magnetic particles within a dielectric material. Varying the concentrations of these "doped" magnetic particles can introduce the required permeability adjustment and achieve OAM modulation of the EM signal. At present, the application using magnetic particle inclusions to vary permeability is limited for microwave application up to a few GHz as no such magnetic material yet exists that can operate at higher frequencies, e.g., optical frequencies.

Figure 3A:
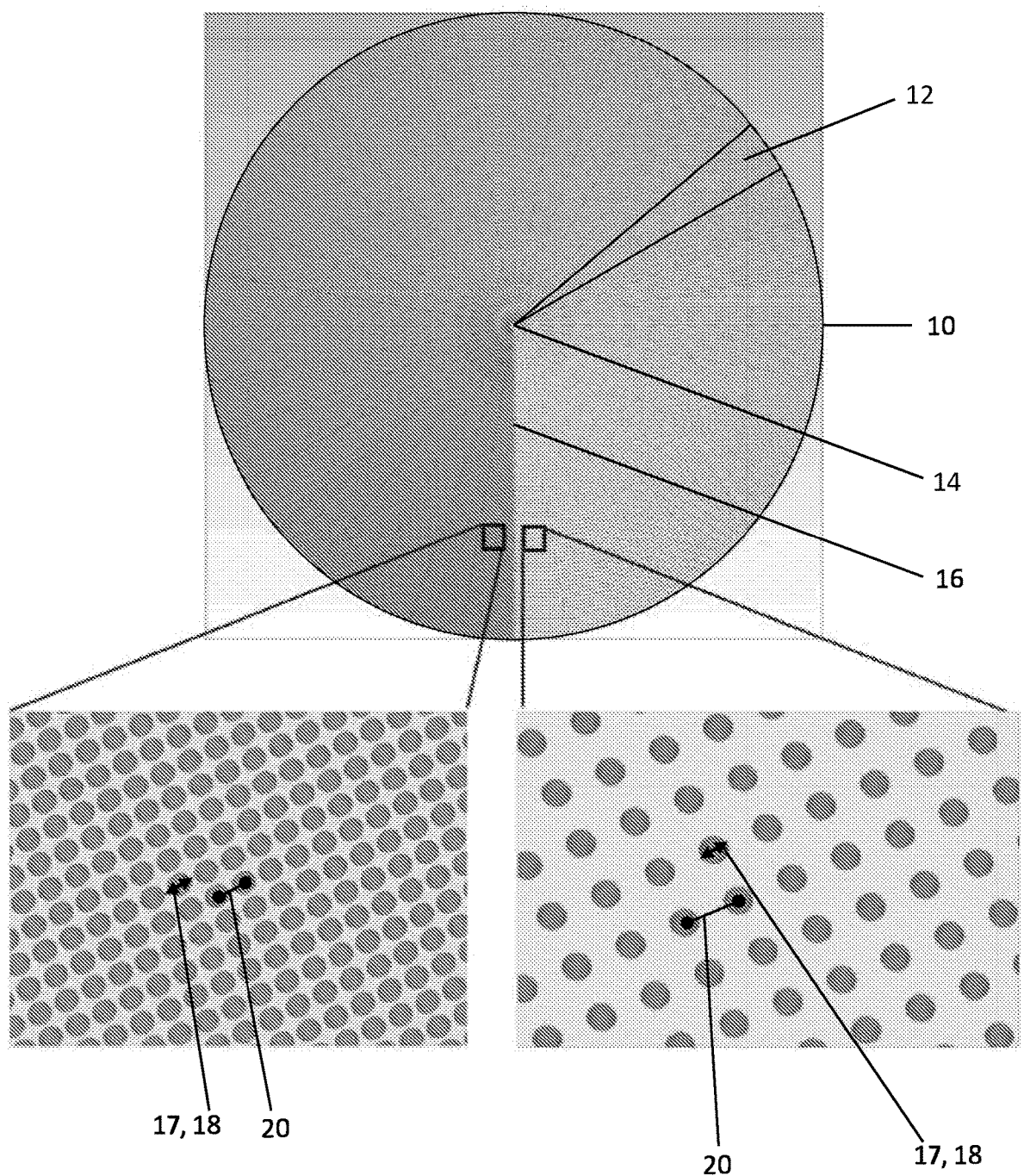
FIG. 3A depicts the design of an FPP according to the present invention, using high permittivity material ($e_r=10$) with different densities of holes in each sector to produce a gradual variation in refractive index. The perforation size is kept constant for ease of manufacturing while the density of the holes is changed, meaning unit cell sizes are varied across the different sections with uniform diameter drill hole perforations to achieve variation in the dielectric constant. The perforated central plate is shown with 36 sections and each section contributes 10 degrees of phase advancement and assuming a planar wave front (constant phase) input to all 36 sections.
Figure 3B:
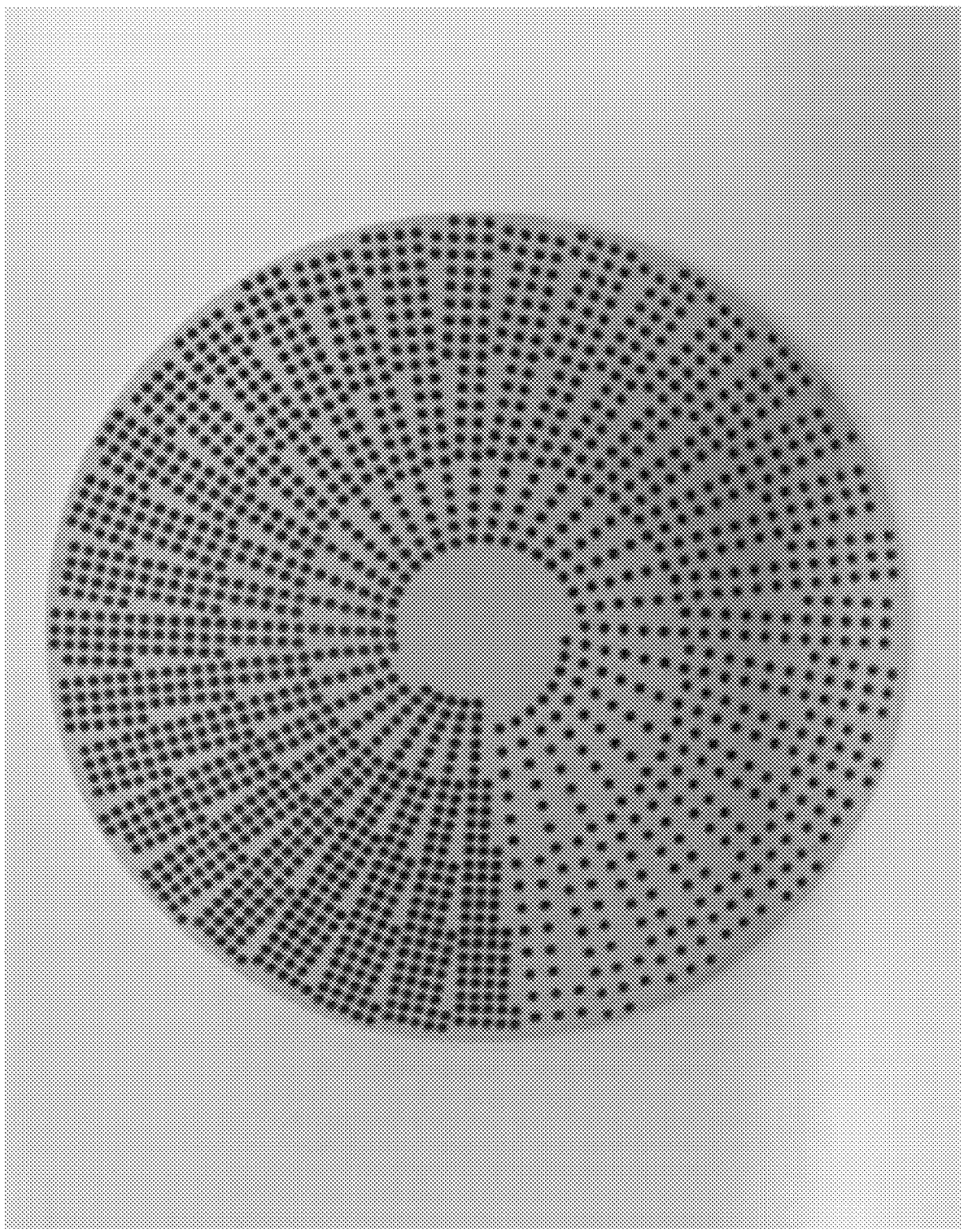
FIG. 3B depicts a prototype OAM FPP L=1, single mode, segmented into 36 sections with iterative numerically determined hole spacing, having no standard unit cell (i.e., no uniform hole packing or distance between the perforations).

In another preferred embodiment, as shown in FIGS. 3A and 3B, the FPP design may incorporate a series of holes 17 or inclusions 18, with variable sizes of perforated unit cells (FIGS. 3A and 3B), e.g., unit cell sizing or the interspacing 20 between holes 17 or inclusions 18 is varied in a circular, spiral or other rotational pattern around the center point 14 of the FPP 10. This pattern results in an abrupt discontinuity 16 in the refractive index around the center point 14. The holes 17 or inclusions 18 may comprise simple air inclusions (i.e., empty holes) or they can be filled with constant or variable density materials as inclusions 18 using 2D or 3D printing techniques. In certain preferred embodiments, the perforations (e.g., holes, inclusions) 17, 18 may be filled with a material containing magnetic particles in order to simultaneously adjust both permittivity and permeability.

Based on this perforated hole design concept, the OAM FPP can be designed to operate at anywhere from a few 100 KHz to ultraviolet frequencies and is capable of providing one or more OAM modes at a particular signal frequency irrespective of polarization. In a preferred embodiment, the OAM FPP is designed for operation at about 30 GHz frequency, with a comparatively large bandwidth of 20 GHz.

Figure 4A:
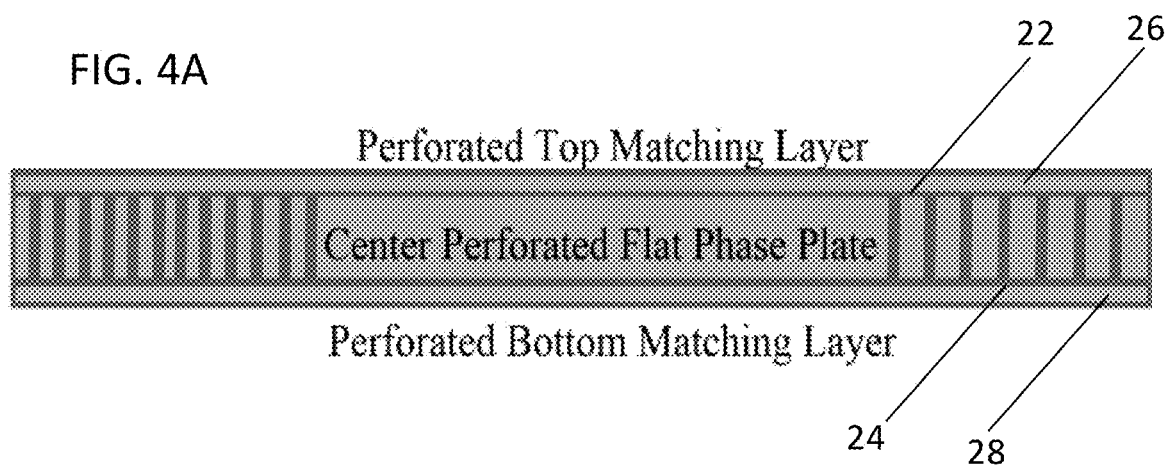
FIG. 4A depicts a cross section of an embodiment of the perforated FPP with perforated top and bottom impedance matching layers.
Figure 4B:
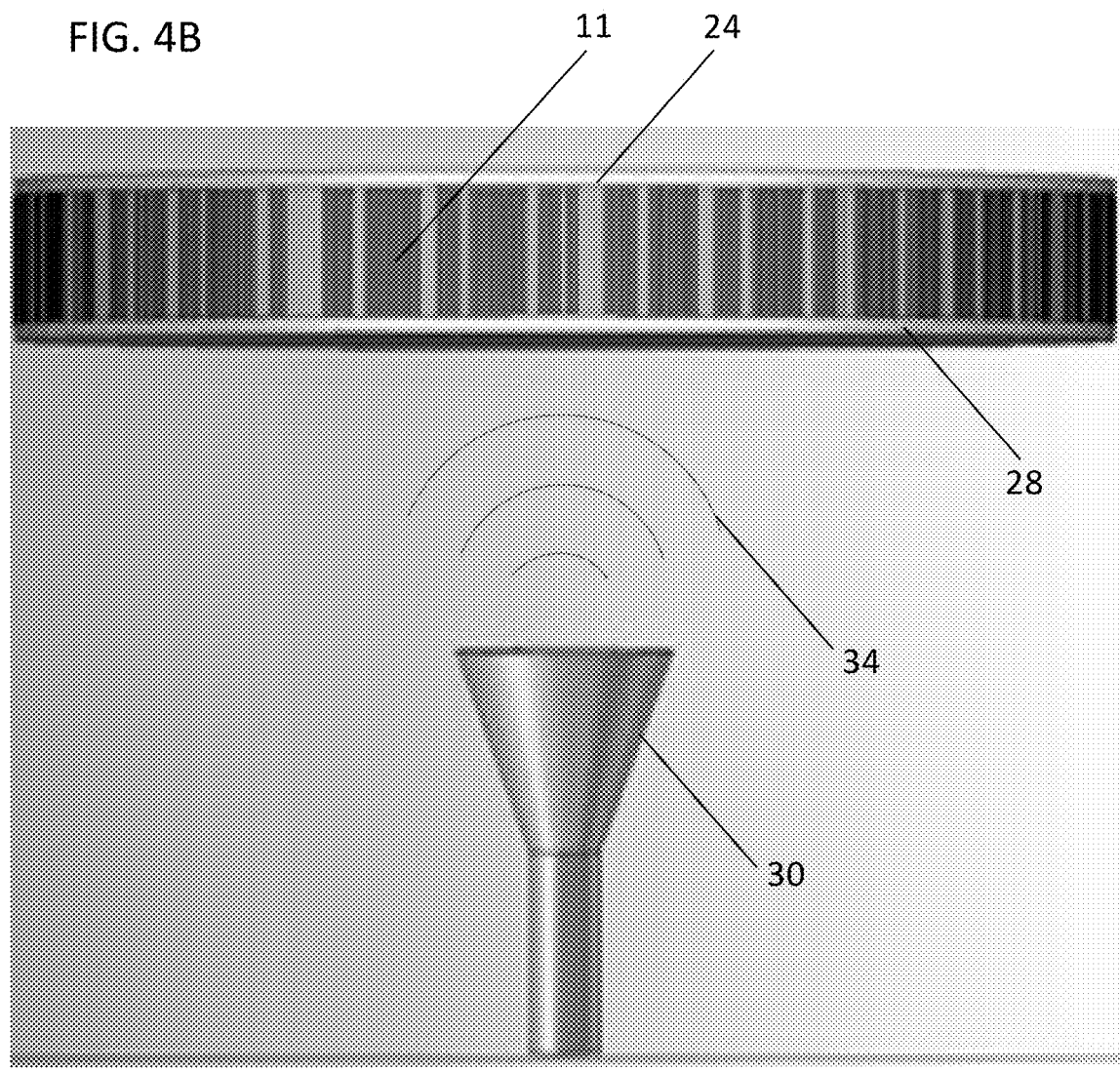
FIG. 4B depicts a typical arrangement for OAM generator that is based on transmission through the FPP rather than on reflection criteria such as with parabolic reflectors.

As, shown in FIGS. 4A and 4B, the FPP can be divided into three portions, i.e., a central part 11, a top part 26 and a bottom part 28. The top part 26 is affixed to a first surface 22 of the FPP 10, and the bottom part 28 is affixed to a second surface 24 of the FPP 10. The top and bottom parts of the FPP may incorporate one or more layers of dielectric sheets or coatings to provide optimal free space impedance matching, thereby minimizing reflection losses at the interfaces between FPP layers as the EM wave propagates through the device and also thereby maximizing transmission efficiency and transfer of energy through the device.

The central part 11 of the FPP may incorporate varied densities of perforations 17, 18 to adjust the permittivity, varied concentrations of magnetic particle inclusions 18 to adjust the permeability, or both. To vary the permittivity, the central part may incorporate multiple sectors 12, i.e., segments or sections, each with different uniform densities of perforations 17, 18, which provide the required phase advancement (compensation) to generate (receive) an OAM modulated (demodulated) electromagnetic wave.

Each sector 12 is more or less densely perforated, depending upon the required permittivity to obtain the desired phase change from each individual sector and produce OAM modulation in the beam. Changing the density or the spacing 20 between of the perforations 17, 18 enables adjustment of the effective permittivity to obtain that required for each sector 12.

In a preferred embodiment the diameters of the holes 17 or inclusions 18 are uniform and the interspacing 20 between adjacent holes and adjacent inclusions is constant within each sector 12, whereas the interspacing 20 is increased or decreased for each adjacent sector 12, thereby resulting in a graded change in permittivity around the circle of the FPP 10.

Thus, the device may form a planar disc or plate that provides the required phase advancements or compensations to generate a helical or rotating or OAM electromagnetic wave (FIG. 2B). The number of sections 12 incorporated in the central part of the circular FPP depends upon the desired accuracy and non-distortion required for the phase front emitted from the FPP.

The layers of the top and bottom parts may or may not be perforated. In addition, the matching layers of the top and bottom parts may be corrugated or textured with some other appropriate pattern. Further, the matching layer may have a thickness of around $\lambda_0/4$ ($\lambda_0$ is the free space wavelength) with a dielectric constant of $\epsilon_{match1} \sim \sqrt{(\epsilon_r)}$, where $\epsilon_r$ is the effective permittivity of a sector 12 of the central part of the FPP. If more than one matching layer is used then the value of $\epsilon_{match2}$ is approximately around $\sqrt{\epsilon_{match1}}$.

FIG. 3A depicts the perforations 17, 18 made in the FPP with varied unit cell size 20 but with constant hole diameter. ECCOSTOCK HIK dielectric with base permittivity and dielectric constant equal to 11 is chosen for the central part. Thickness is 12.8 mm and RT/duroid RO4350B dielectric with permittivity 3.48 and top and bottom matching layers have thicknesses of 1.5 mm.

FIG. 3A also shows that for Q band OAM generation, hole diameters of the central part are kept constant at 500 microns. Further, interspacing 20 between the holes 17 is gradually increased from 604 microns to 1018 microns, around the center point 14 of the FPP, resulting in a graded permittivity and permeability and an abrupt discontinuity 16 in the effective refractive index. In preferred embodiments, this device is fabricated at between 1 mm to 100 mm thick.

The holes 17 or inclusions 18 of the central part 11 of the FPP 10 comprise may comprise air-inclusions (i.e., empty holes) in the base dielectric material, the size and density of which adjust the effective permittivity of the base dielectric. For ease of manufacturing, rapid, bulk and efficient fabrication, the hole diameters may be kept constant. Further, the flat disc shape makes the FPP compact and easy to install.

The diameter of the holes 17 or inclusions 18 and the interspacing 20 between the holes 17 or inclusions 18 are dependent upon the frequency of operation. The distance 20 between consecutive holes 17 or inclusions 18 may be constant for each sector 12, but may be increased or decreased for each adjacent sector 12. This uniform interspacing 20 between any two holes 17 and any two inclusions 18 establishes the size of a unit cell structure within any given sector 12.

Figure 5:
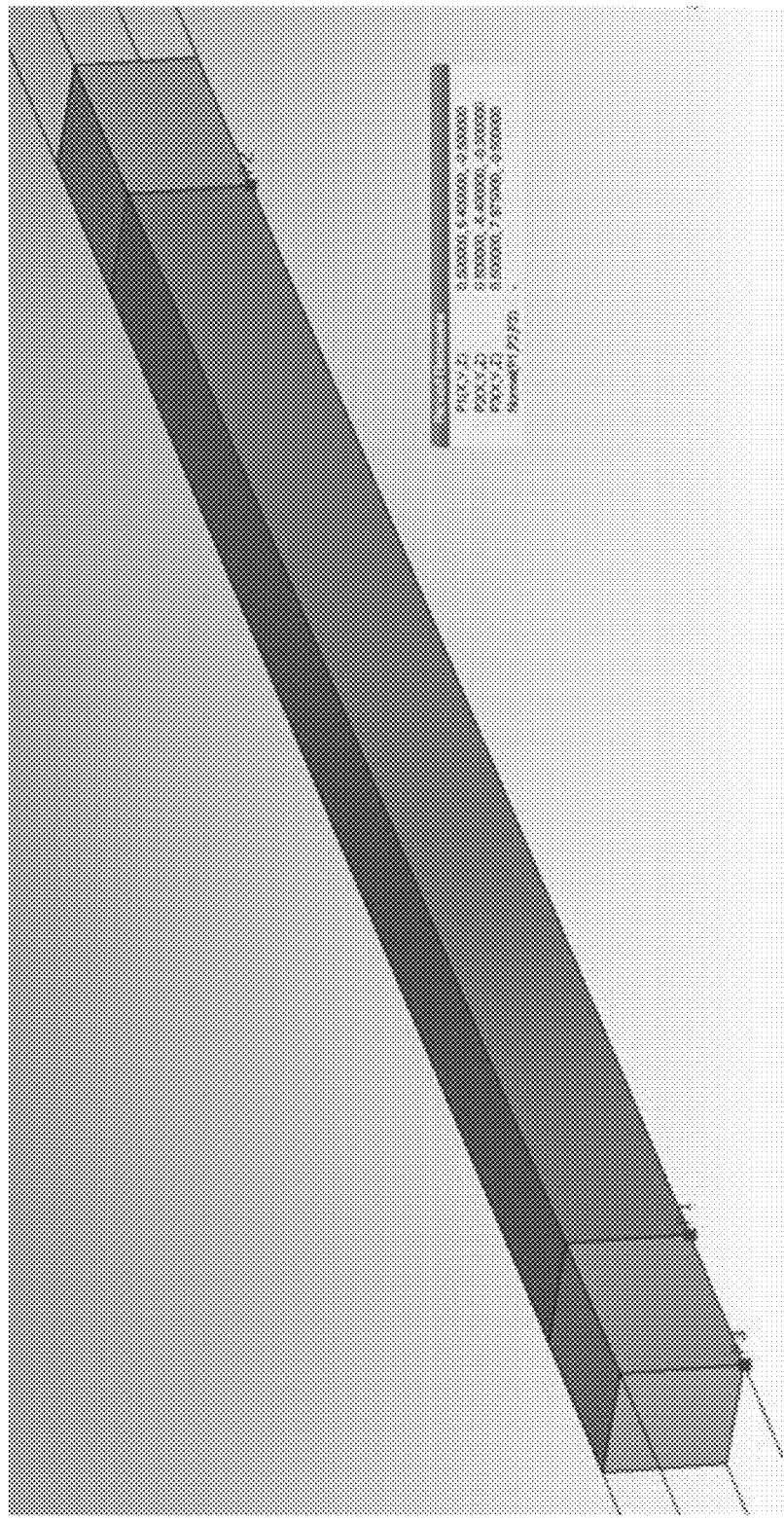
FIG. 5 shows a typical unit cell with top and bottom matching layer and the central part is a perforated dielectric with a cylindrical shape air inclusion.

A unit cell (FIG. 5) can be defined as a smallest repeating structure that could represent the material bulk property incorporating all the parameters such as diameter of the holes 17 or inclusions 18 and interspacing 20 of the holes 17 or inclusions 18. In a preferred embodiment, the design of the present invention incorporates a constant diameter hole 17 or inclusion 18 for each sector 12 but with different unit cell sizes as between the different sectors 12.

The maximum edge length of a square shaped unit cell (or the maximum distance between two points on the surface area of the unit cell) can be assumed to be no more than $\lambda_0/10$ of the operational frequency, where $\lambda_0$ is the free space wavelength of the operational frequency. However, this is a generalization and this technology doesn't impose any restriction on choosing the unit-cell size as being required to be less or more than $\lambda_0/10$.

Air inclusions in the base material can be achieved using open perforations, i.e., unfilled holes, or by varying the fill density using 3D printing techniques. Low loss, high dielectric constant (i.e., high electrical permittivity and/or high magnetic permeability) materials in powder, nanometer, micrometer, or millimeter particles can be used for 2D or 3D printing using various novel processes, in a matrix of PTFE, PLA, and/or ABS. The list of high permittivity and permeability materials includes, but not limited to, the following materials:

1. Strontium titanate ($SrTiO_3$)
2. Barium Titanate ($BaTiO_3$)
3. Strontium Barium Titanate ($Sr_xBa_{1-x}TiO_3$)
4. Aluminum Oxide ($Al_2O_3$)
5. Titanium Dioxide ($TiO_2$)
6. Lead Zirconate Titanate ($Pb[Zr_xTi_{1-x}]O_3$)
7. Calcium copper titanate ($CaCu_3Ti_4O_{12}$)
8. Magnesium Oxide (MgO)
9. Calcium Titanate ($CaTiO_3$)
10. Calcium/Barium/Strontium Zirconate (Ba/Sr/Ca-$ZrO_3$)
11. $Ba_{12-2x}(Zo, Zn, Mn)_xTi_xO_{19}$
12. $BaFe_{12}O_{19}$
13. $Co_2Z(Ba_3Co_2Fe_{24}O_{41})$
14. $Ba_3(Co, Mn, Ni, Zn)_2Fe_{24}O_{41}$
15. $Ba(Co,Mn,Ni,Zn)_2Fe_{16}O_{27}$
16. Cobalt & Holmium Doped Garnets
17. Gadolinum Substituted Garnets In an alternative preferred embodiment, the OAM FPP may also be produced by continuously varying or changing the distance 20 between adjacent holes 17 or inclusions 18 around a circle of constant radius, rather than changing the interspacing 20 between adjacent holes 17 or inclusions 18 only between different sectors 12. Different circles of these holes 17 or inclusions 18 may be drilled into the dielectric, magnetic, magneto-dielectric, metallo-magnetic, metallo-dielectric, metallo-dielectric-magnetic or metamaterial plate from radius 0 up to R, where R is the radius of the plate.

Further, continuously varying or changing the diameter of the holes 17 or inclusions 18 around a circle of constant radius may also be employed to vary permittivity. However, as previously indicated this would negatively impact the complexity of the manufacturing process.

In another alternative preferred embodiment, permeability of the material forming the central part 11 of the FPP 10 may be varied using techniques to add magnetic particles into a dielectric material. The doped magnetic particle can introduce the required permeability for each sector 12, or alternatively, concentrations of the doped magnetic particles may be varied continuously in a circular pattern around a center point 14 of the FPP 10. At present, the application of varied permeability is limited for microwave application up to a few GHz as no magnetic material yet exists that is capable of operating at higher frequencies such as optical frequencies.

Figure 6:
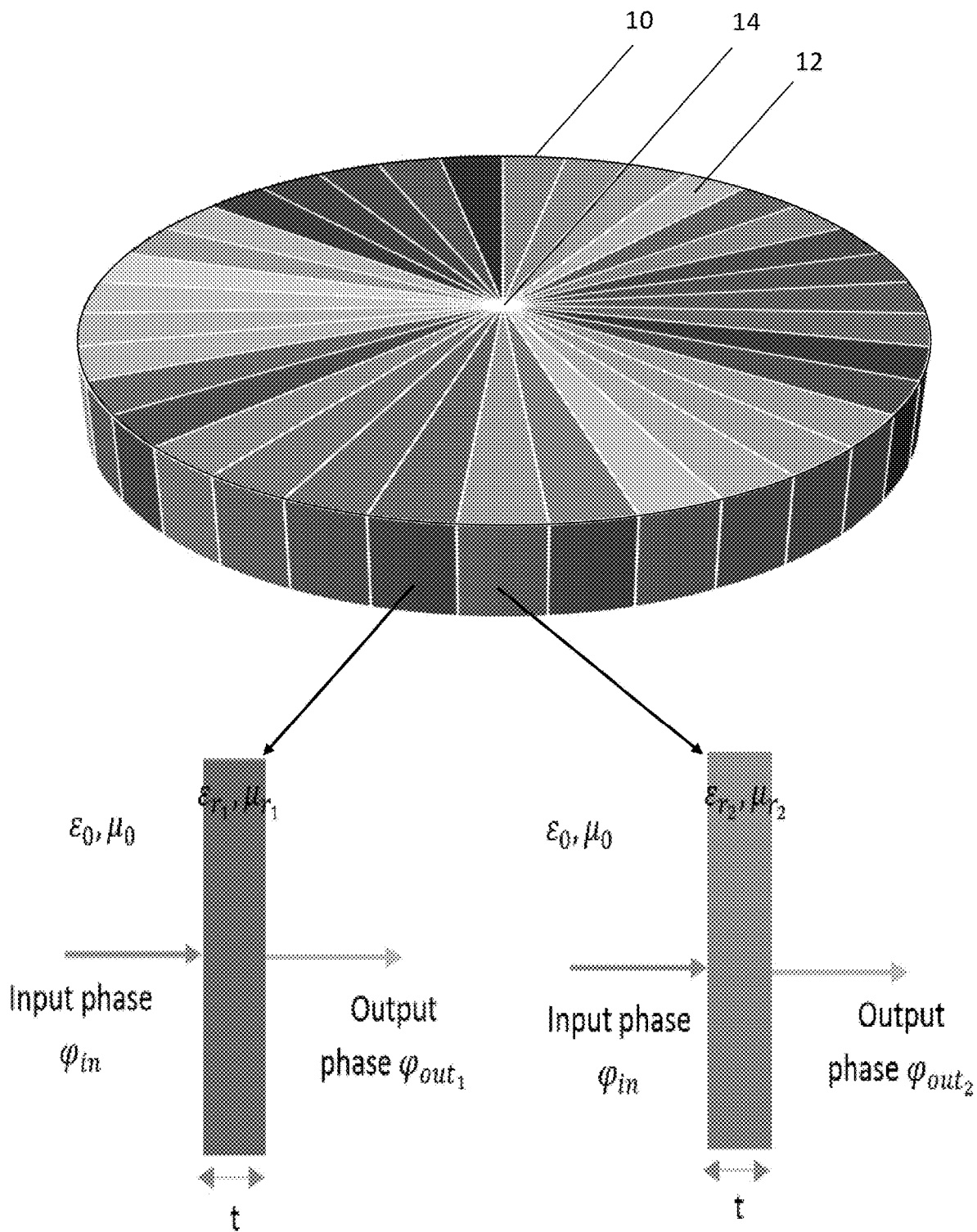
FIG. 6 depicts the OAM FPP design to produce OAM in a plane wave, with each section has a different effective refractive index which gradually changes in a circle around the FPP. The impedance matched FPP is made of 36 sectors each having a different permittivity to produce a gradual phase change on the EM beam.

FIGS. 3A, 3B and 6 show a typical arrangement for OAM generator that is based on transmission criteria through the FPP, rather than apparatus based on reflection criteria such as parabolic reflectors. Thickness of the plate is constant and the diameter of perforation is constant, which results in generation of precise phase fronts in addition to rapid and easy manufacturing processes. The FPP of the present invention has flat surfaces on both sides and only a single dielectric material may be used, without need of multiple dielectric materials to achieve OAM phase front.

Further, the FPP of the present invention contains no metallic parts, eliminating any potential for ohmic losses. These characteristics are advantageous, especially as compared to conventional metallic parabolic reflectors. The design has additional advantages over parabolic metal reflectors designed for OAM beam, such as light weight, compact, easy fabrication, cheaper for mass production and no source blockage or off-axis feed.

We have fabricated an OAM FPP which can produce a modulated EM wave having orbital angular momentum. The FPP has 36 sectors with each sector having different permittivity. Shown in the photo are different sectors having different density of holes resulting in an effective change in angular permittivity. Thus the permittivity of the FPP varies around the circumference monotonically, but is kept constant along the radial length of each sector to produce an OAM beam with angular phase variation of 0°-360°. Accordingly the corresponding to angular momentum that the FPP generates is L=1. Such FPPs can be fabricated for higher order OAM modes. The polarization of the electric and magnetic fields of the EM wave do not change appreciably as the wave passes through the FPP.

The angular phase modulation of the radiation beam can be achieved by delaying/advancing the waves passing through an appropriately designed FPP. This can be obtained by a dielectric disc of type shown in FIGS. 3A, 3B, 4A, 4B, 6, and 8-12. The dielectric constant of the disc varies with angle, in accordance with $2(\pi L/N)\phi$, where $\phi$ is the azimuth angle (0°-360°), L is the mode number (1, 2, 3 . . . ), and N is the number of sections. The refractive index $\eta$ of each sector is given by $n=\lambda\phi/2\pi t$, where $\lambda$ is the wavelength of the operation frequency and t is the thickness of the plate.

To design the FPP with continuous variation of permittivity along a circular disc made of RT Duroid ($\varepsilon_r=10:8$) with thickness t=1 cm is chosen. The disc is divided into N angular sectors within 0-2$\pi$. The permittivity $\varepsilon_r(=\varepsilon_{eff})$ of each sector may be computed using the Maxwell Garnett or Bruggerman equations as detailed below.

To calculate the effective permittivity for the unit cells of each sector 12, the Maxwell Garnett mixing rule for homogenous mixture of dielectrics may be used. A perforated quarter wavelength matching layer may be provided on the both sides of the FPP to reduce the reflectivity to its minimum value. The dielectric constant of the matching layer is also varied to match each sector of the central plate.

To achieve the effective permittivity of each section, the plate has been perforated by drilling holes. The perforation has to be done by removing out the appropriate volume fractions from each sector of the dielectric disc. The volume fractions, of the perforated portions can be computed using the well-known homogenization/effective medium approximation techniques like Maxwell Garnett, or Bruggeman equations.

The effective permittivity for a mixture comprising two dielectric components, in which one is treated as host and other as inclusion phase, can be calculated from the Maxwell Garnett formula as given in following equation:

$$\varepsilon_{\mathit{eff}} = \varepsilon_e + 2f\varepsilon_e\left[\frac{\varepsilon_i - \varepsilon_e}{\varepsilon_i + \varepsilon_e - f(\varepsilon_i - \varepsilon_e)}\right]$$

where, circular cylinders of permittivity $\epsilon_i$ are located randomly in a homogenous environment with permittivity $\epsilon_e$ and occupy a volume fraction f. The quasistatic nature of the mixture means that the wavelength of the field is much larger than the diameter of the holes or inclusions 18.

Alternatively, the Bruggerman equation is also suitable for determining the effective permittivity of the perforation or cylindrical inclusion configuration created by drilling cylindrical holes into the plate material.

$$\epsilon_{\mathit{eff}} = \frac{\epsilon_i + \epsilon_d + v(\epsilon_i - \epsilon_d)}{\epsilon_i + \epsilon_d - v(\epsilon_i - \epsilon_d)}$$

describing the relation between the required permittivity values in each sector and the amount of volume fraction to be filled with air, where $\in_d$ and $\in_t$ are the relative permittivities of the disk and air, respectively. Each sector is further subdivided into a suitable number of radial sections to best optimize the permittivity matching capable of being achieved.

The number and arrangement of holes was determined via an iteration based optimization technique programmed in Java, designed to most evenly distribute the holes within each individual section while maintaining a particular desired separation distance and required permittivity. After a careful consideration of hole sizes to fill each sector and manufacturing issues, a constant hole size of 800 microns separated by 100 microns has been maintained throughout the design for each of the 4 plates with modes ranging from L=1, 2, 3 and 4. These plates are illustrated in FIGS. 8-12 with their respective phase responses.

The circle packing algorithm that was used to create the FPP design generated a distribution of holes using an iterative algorithm implemented in Java. The algorithm had two goals: 1) meeting the required permittivity value for each sector 12 of the FPP 10 and 2) density in the distribution of the holes over a constrained domain, bounded by a range of azimuthal angles and concentric distances within each sector, with either set or variable additional parameters including the diameter (i.e., size) of the individual holes and the distance (i.e., space) separating them. Thus, the hole distribution can be more of a random distribution than a periodic arrangement within each sector.

The hole packing algorithm started with a maximal density of packed holes, as permitted by or set based on the material tolerances. From this starting point the algorithm operated to increase the distance or spacing between the holes along a radius r, in the angular direction (θ), as necessary to more closely approximate numerically the desired effective permittivity ($\in_{\mathit{eff}}$).

To improve accuracy and minimize error in the effective permittivity, we subdivide each sector into various segments, each segment comprising part of a sector formed by a portions of a concentric ring, bounded by radially extending intra-sectorial zone edges.

In this way, the FPP as a whole may be radially divided into N number of concentric rings, with N varying from 5-5000. In a preferred embodiment N varies between 10-20. In addition, each sector 12 of the FPP 10 may be further subdivided into M number of intra-sectorial zones, with each concentric ring containing M number intra-sectorial zones within each sector 12. Using the circle packing optimization algorithm for each segment, we produce a highly uniform effective permittivity for each sector.

The iterative method was used to obtain angular variation of effective permittivity for each concentric ring by optimizing the distance between the holes. The increased spacing between the adjacent holes was iteratively changed until an arbitrary threshold or tolerance was met to produce the closest possible approximation of the effective permittivity required for that sector. The optimal solution was obtained by minimizing the error between required permittivity and the effective permittivity resulting from the dielectric host material having holes (filled with air) of a certain density (See Table I).

It is our firm belief that optimizing the hole density using this algorithm based on intra-sectorial segmentation to produce a uniform effective permittivity over the entire sector is novel. We had initially attempted optimizing hole density for a whole sector at one time, using a uniform spacing or distance between the holes in each sector. However, we found that we were unable to produce a uniform effective permittivity for a given sector using this method.

The novelty of our method, as embodied in our FPP device, comes from the fact that the holes or cavities were not simply pasted in repetitive patterns over some sub-sectional component of the plates, but rather they were evenly distributed by an iterative algorithm. Because it is iterative, this algorithm is essentially computationally self-created to address the problem at hand, as arbitrarily defined. This algorithm provides for far more even distribution of the holes or cavities and improves the OAM wave modulation, by literally performing billions of combinations of designs over a short period of time (one or more days).

The following is a generalized abstract mathematical expression of the operation of the algorithm, $$f: E, D, S \rightarrow P$$

E={e|e is the desired epsilon of the angular division of the plate}

D={d|d is the minimum desired/required separation distance between any two individual cavities over the surface of the plate}

S={s|s is a sectional division of the plate with an outer and inner radius, and with an upper and lower bounded angular value around the plates central axis}

P={p|p is the same provided sectional division of the plate under observation, with attributed x,y values for the placement of n cavities, with n determined by the central angular value of the section and the particular provided epsilon value, e}

TABLE I

RELATIVE % ERROR IN REALIZED $\epsilon$ AND ACHIEVED OAM PHASES

|  | Outer | | Inner | | Outer | | Inner | |
| --- | --- | --- | --- | --- | --- | --- | --- | --- |
|  | $\epsilon_\mu$ | $\epsilon_\sigma$ | $\epsilon_\mu$ | $\epsilon_\sigma$ | $\phi_\mu°$ | $\phi_\sigma°$ | $\phi_\mu°$ | $\phi_\sigma°$ |
| Mode1 | 0.36 | 0.23 | 4.3 | 5.09 | 0.18 | 0.12 | 2.2 | 2.64 |
| Mode2 | 0.42 | 0.31 | 3.57 | 4.6 | 0.21 | 0.15 | 1.81 | 2.38 |
| Mode3 | 0.42 | 0.37 | 4.77 | 4.77 | 0.21 | 0.18 | 2.4 | 2.44 |
| Mode4 | 0.42 | 0.29 | 5.06 | 5.14 | 0.21 | 0.15 | 2.54 | 2.6 |

Table I indicates the mean relative error $\in_\mu$ and the associated standard deviations $\in_\sigma$ in matching permittivity over all given sections of each FPP. Table 1 also indicates the mean relative error $\phi_\mu$ and the associated standard deviations $\phi_\sigma$ of the relative error expected for the OAM phases.

The denotation of "Outer" and "Inner" is made to illustrate the difference in the success of matching the desired permittivities for all outer most radial divisions of a particular sector and the singular innermost radial division, where the angular separation between sections became too small to pack any more holes within.

Mean relative errors in the expected and achieved phase shifts are also listed with their associated standard deviations. The distinction of "Outer" and "Inner" here has an identical purpose to that mentioned for the relative errors in permittivity. Variation in the permittivity of the dielectric material used for FPP design and its consequences are also investigated. It is found that lower permittivity material results in better and clean OAM modes as the reflections from the surface of the FPP are minimized.

A key aspect is the total permittivity change of the angular sectors that together are producing OAM modes. In the case of high permittivity material such as Duroid 5880 with $\varepsilon_r$=10.2 perforation of holes leads to permittivity change from 10.2 to 5 to produce OAM L=1 mode. Such a large change of permittivity results in different reflections of the incident wave at the interface leading to large changes power transmitted through each sectorial region. This leads to angular amplitude changes of the as the signal emerges from the FPP.

Figure 13A:
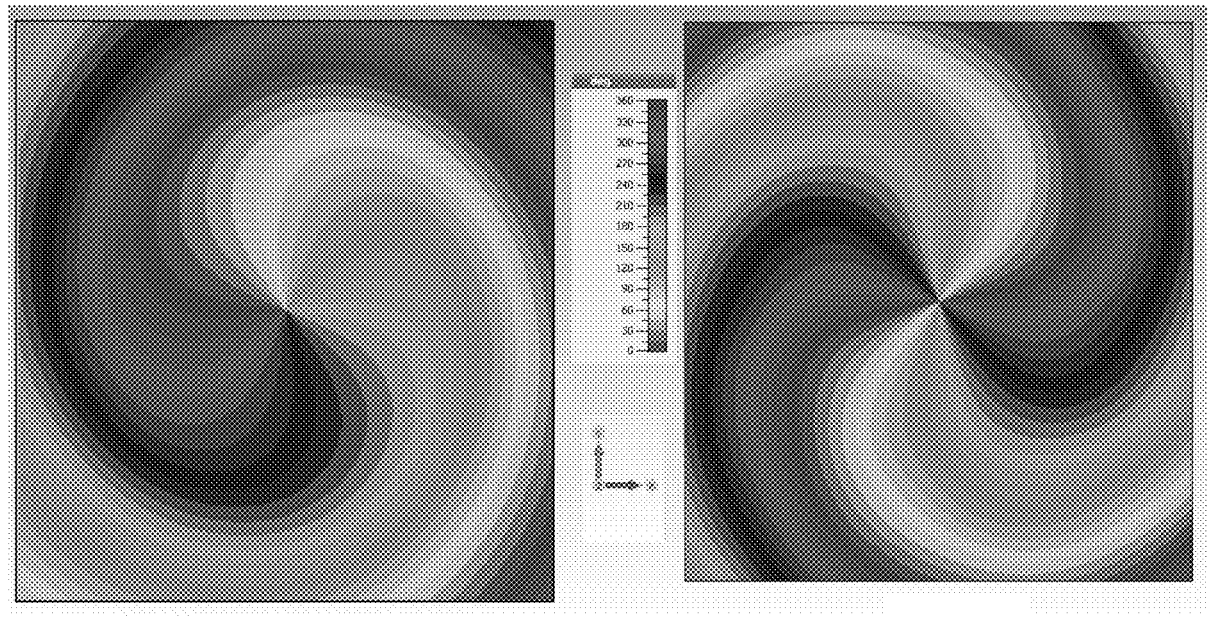
FIG. 13A depicts the spiral distribution of the E-field phase front for OAM spiral EM beams simulated in CST Microwave Studio keeping the FPP in the far-field of a linearly polarized horn antenna. Note the phase of the spiral mode changes from 0° to 360° for one circular rotation resulting L=+1 (bottom) and L=−2 (top) OAM modulation. Multiple such modulations with different L=±(1, 2, 3, 4, ..., ℓ) are possible.
Figure 13B:
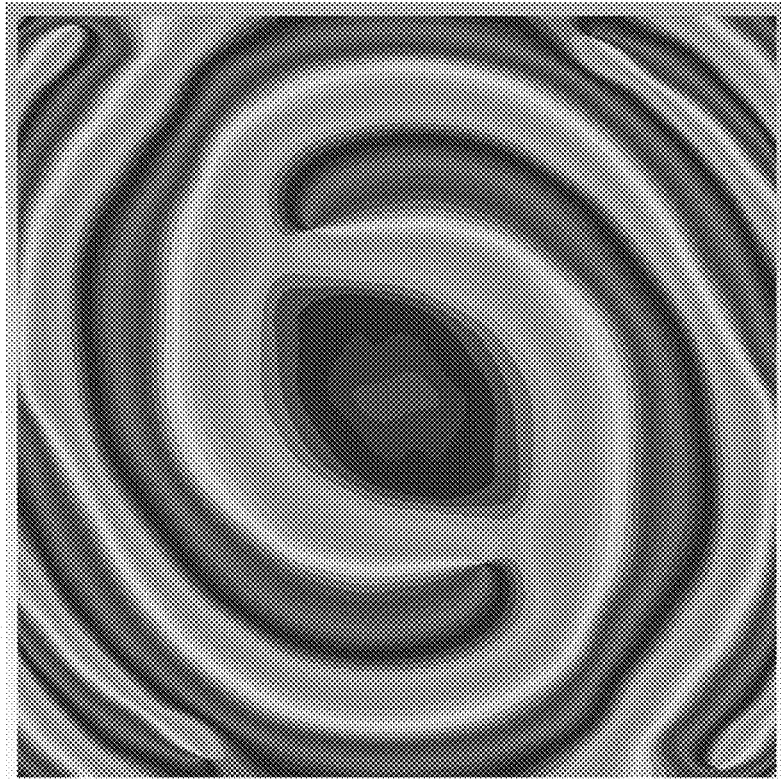
FIG. 13B depicts the orbital angular momentum modulation of the EM wave for a FPP designed using Teflon.

Therefore, a dielectric material with lower permittivity is a better choice. FIG. 13B shows the L=2 OAM mode generated using a Teflon FPP with starting permittivity of 2.1. The holes in the material are drilled as described above to produce OAM FPP. Note that the signal that emerges through Teflon FPP is clean with minimal angular amplitude variation.

Figure 12:
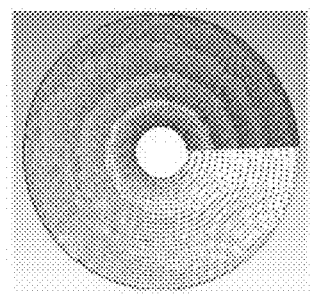
FIG. 12 depicts OAM FPPs in the column of left hand panels generated using iterative numerical circle packing methodology, from top to bottom: a single mode FPP, L=1, a double mode FPP, L=2, a triple mode FPP, L=3, and a quadruple mode FPP, L=4. Corresponding phase responses of the various FPPs are depicted in the right hand panels for the four distinct orthogonal OAM modes (respectively, top to bottom: L=1, 2, 3, 4) produced by the respective FPPs.
Figure 12:
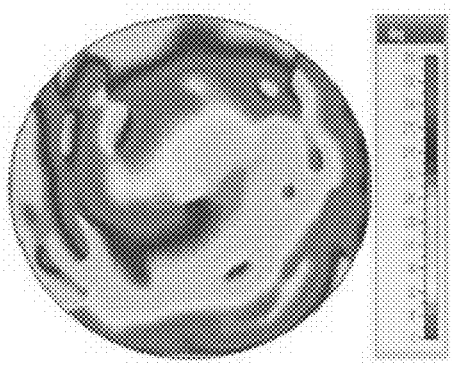
Figure 12:
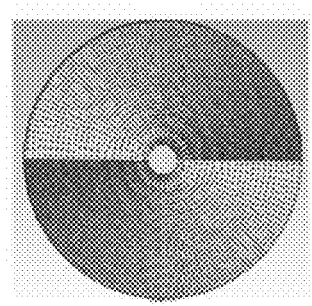
Figure 12:
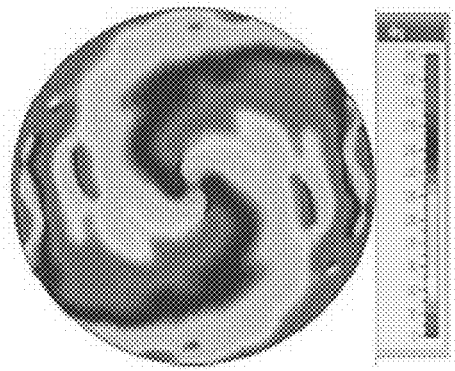
Figure 12:
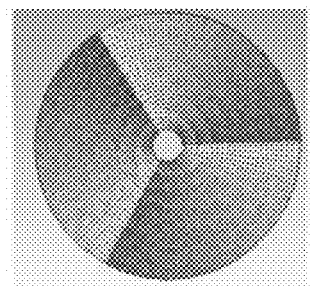
Figure 12:
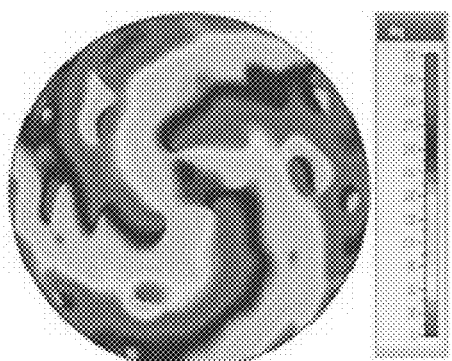
Figure 12:
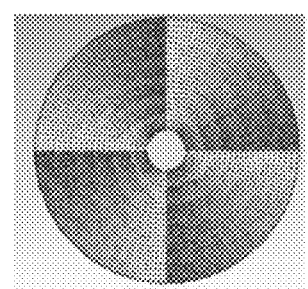
Figure 12:
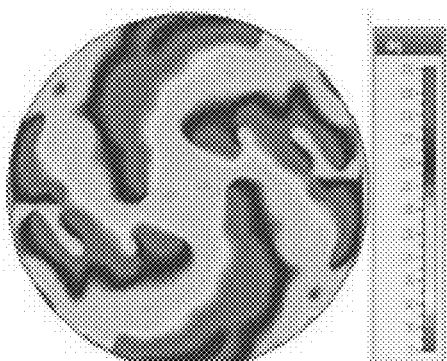

The results shown in FIGS. 12 and 13B clearly demonstrate OAM modes at mm-wave frequencies. The OAM modes produced using FPP are unambiguous and can be used for new multiplexing and high data rate transmission.

FIGS. 3A, 3B and 6 show the sectors 12 of the central part 11 of the FPP 10 with 36 sections 12. A planar wave front is assumed (constant phase as input for all the sectors) as the input phase for all 36 sectors. Each sector 12 can provide a phase advancement or compensation (depending upon the clockwise or anti-clockwise orientation) of 10° compared to adjacent sectors. The plate can provide ±L ($\ell$ is an integer value other than 0, i.e., L=±1, ±2, ±3 . . . ±$\ell$ ) orbital angular momentum, with +L OAM for its clockwise orientation of dielectric sectors and −L OAM for an anti-clockwise orientation.

The phase required for each element or sector 12 to collectively enable the FPP disc to create phase advancement or compensation necessary to generate OAM of L=±1 is described below. The same calculation with different L values can help determine phase adjustments required to achieve higher order single mode OAM states, $\ell$ =±2, ±3, . . . etc. Similar calculations are required for multi-mode (e.g., L=±1+L=±2, etc.) diffractive OAM and non-diffractive OAM modes, but these calculation will be slightly different.

This means that the following derivation is applicable solely to the FPP design for generating diffractive, single mode OAM:

$$\varphi_i - \varphi_{i+1} = 2\pi/36 = k_0 t(\sqrt{\varepsilon_i \mu_i} - \sqrt{\varepsilon_{i+1}\mu_{i+1}}) \text{ Mode}=L=\pm 1$$

The wavelength inside the material for a first sector (1) is:

$$\lambda_{g_1} = \frac{\lambda_0}{\sqrt{\varepsilon_{r_1}\mu_{r_1}}}$$

where, $\lambda_{g_1}$ is the guided wavelength inside the sector 12 with effective permittivity $\varepsilon_{r_1}$ and effective permeability $\mu_{r_1}$. $\lambda_0$ is the free space wavelength of the radiated beam. For non-magnetic media $\mu_{r_1}$=1.

Similarly for a neighboring sector (2), the wavelength inside the material is:

$$\lambda_{g_2} = \frac{\lambda_0}{\sqrt{\varepsilon_{r_2}\mu_{r_2}}}$$

where, $\lambda_{g_2}$ is the guided wavelength inside the sector 12 with effective permittivity $\varepsilon_{r_2}$ and effective permeability of $\mu_{r_2}$.

So, the phase difference between these two consecutive sectors 12 is $$\varphi_{out_1} - \varphi_{out_2} = t \Big/ \frac{\lambda_{g_1}}{2\pi} - t \Big/ \frac{\lambda_{g_2}}{2\pi} = k_0 t(\sqrt{\varepsilon_{r_1}\mu_{r_1}} - \sqrt{\varepsilon_{r_2}\mu_{r_2}}) = 2\pi/n$$

where, n is total number of elements, t is the thickness of each sector, including top, bottom and central parts, and $\varphi_{out_1}$ and $\varphi_{out_2}$ are the phase outputs of sector 1 and sector 2, respectively.

Or, for the case of 36 sectors:

$$\varphi_{out_1} - \varphi_{out_2} = t \Big/ \frac{\lambda_{g_1}}{2\pi} - t \Big/ \frac{\lambda_{g_2}}{2\pi} = k_0 t(\sqrt{\varepsilon_{r_1}\mu_{r_1}} - \sqrt{\varepsilon_{r_2}\mu_{r_2}}) = 2\pi/36$$

Figure 7A:
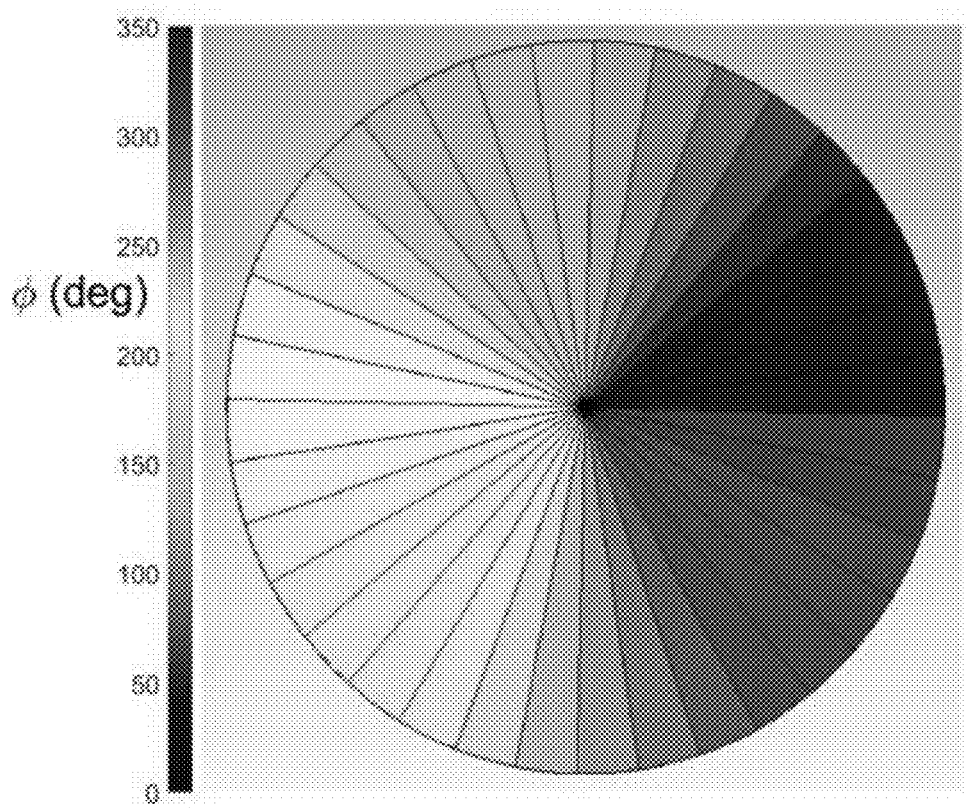
FIG. 7A depicts an FPP with angular variation of $\varepsilon_r$ for singular mode OAM and corresponding phase shift for mode L=1.
Figure 7B:
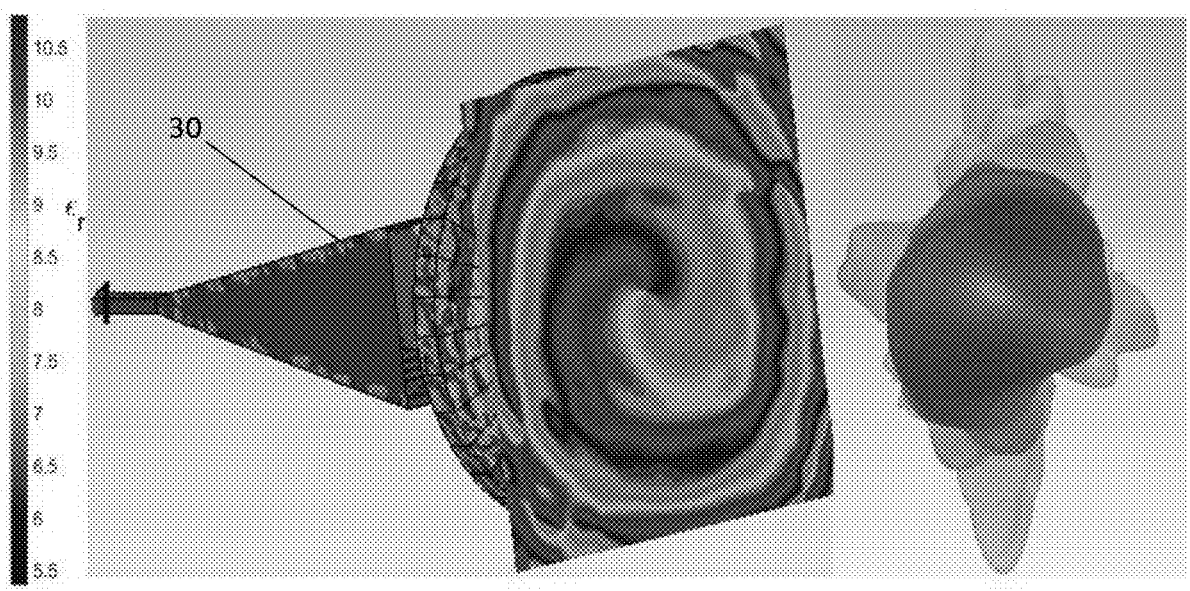
FIG. 7B depicts the experimental simulation setup with horn excitation and the far-field vortex OAM pattern showing a null at the center.
Figure 8:
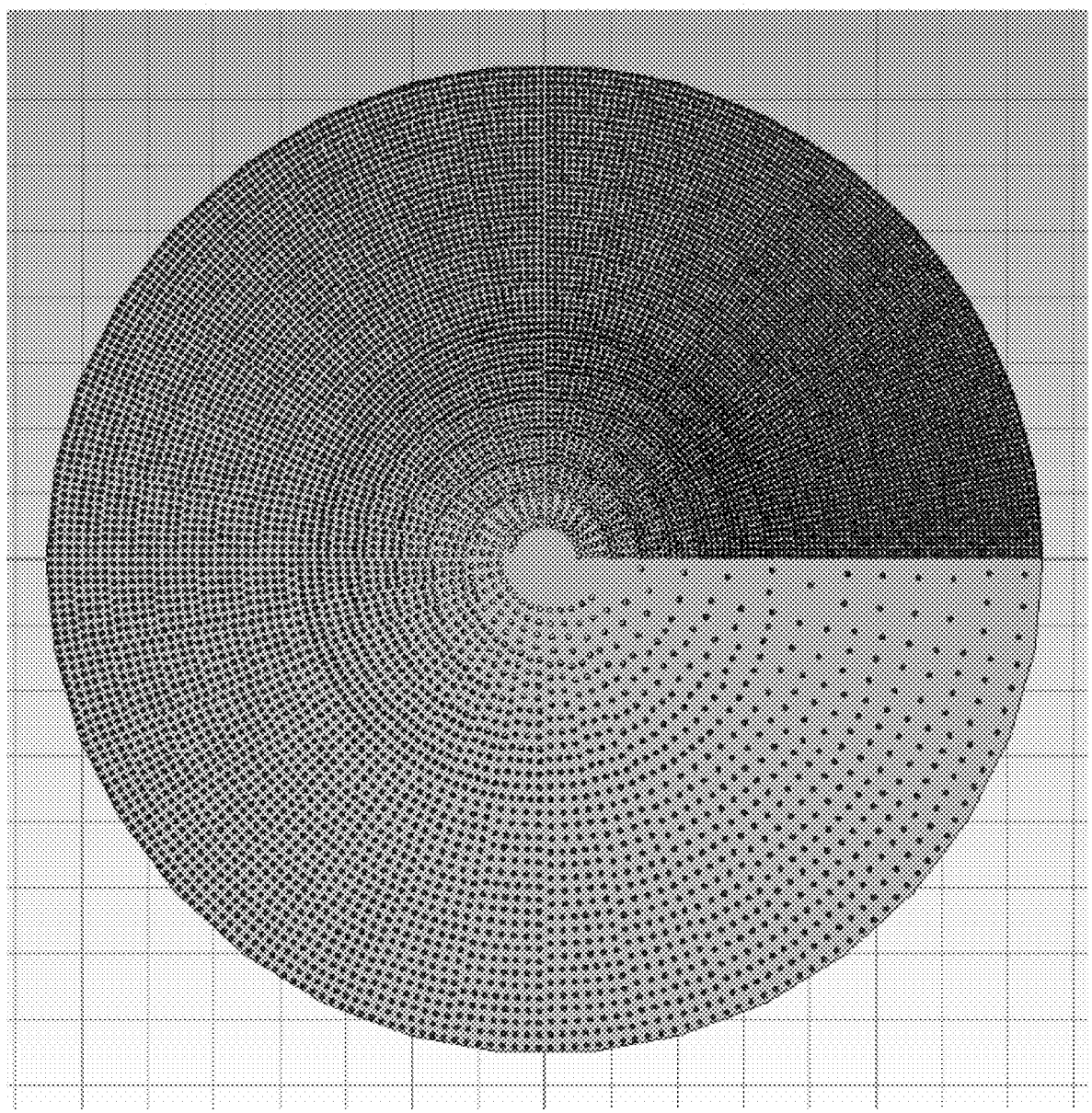
FIG. 8 depicts a single mode, L=1, OAM FPP generated using iterative numerical circle packing methodology.
Figure 9:
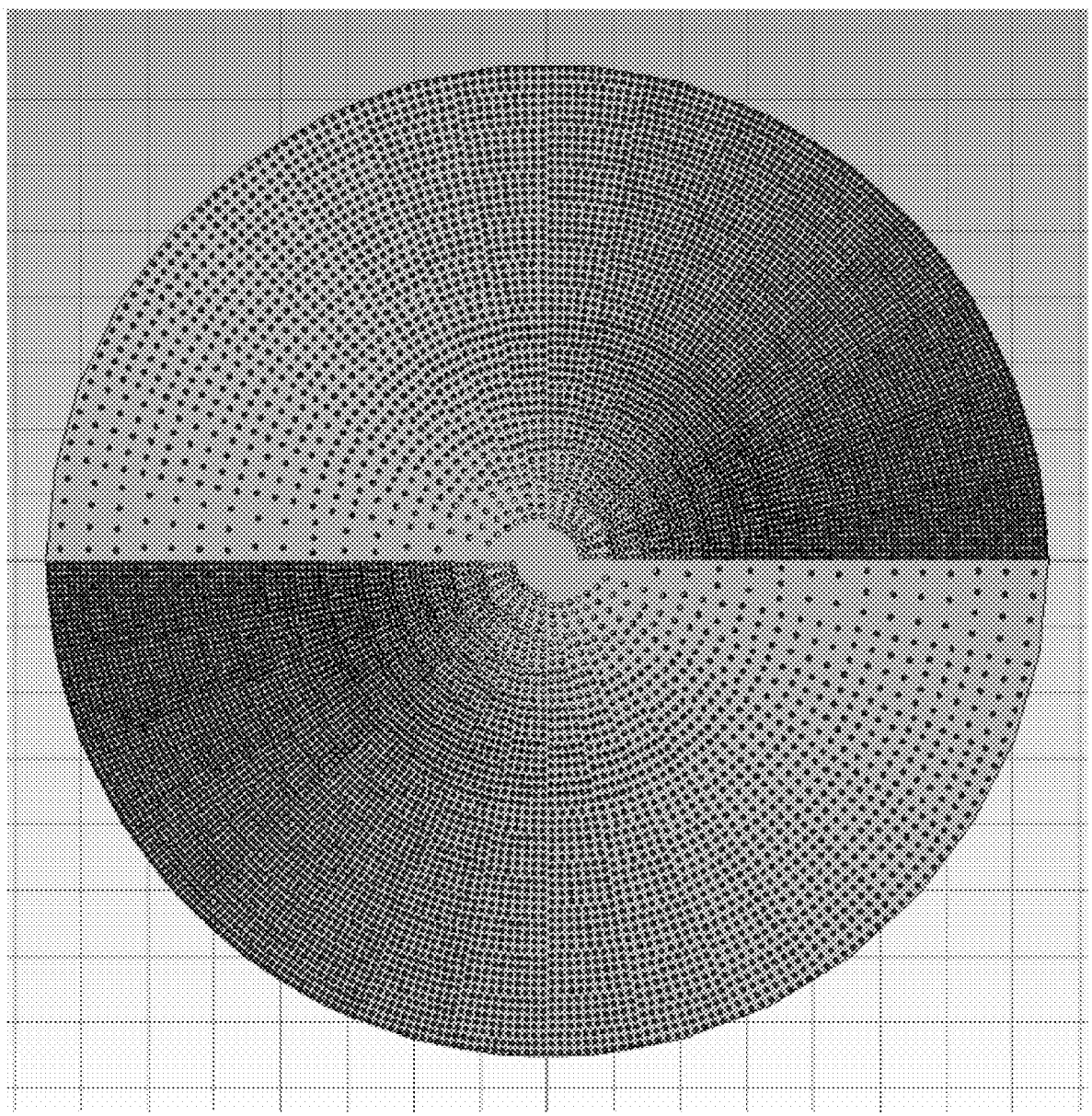
FIG. 9 depicts a double mode, L=2, OAM FPP generated using iterative numerical circle packing methodology.
Figure 10:
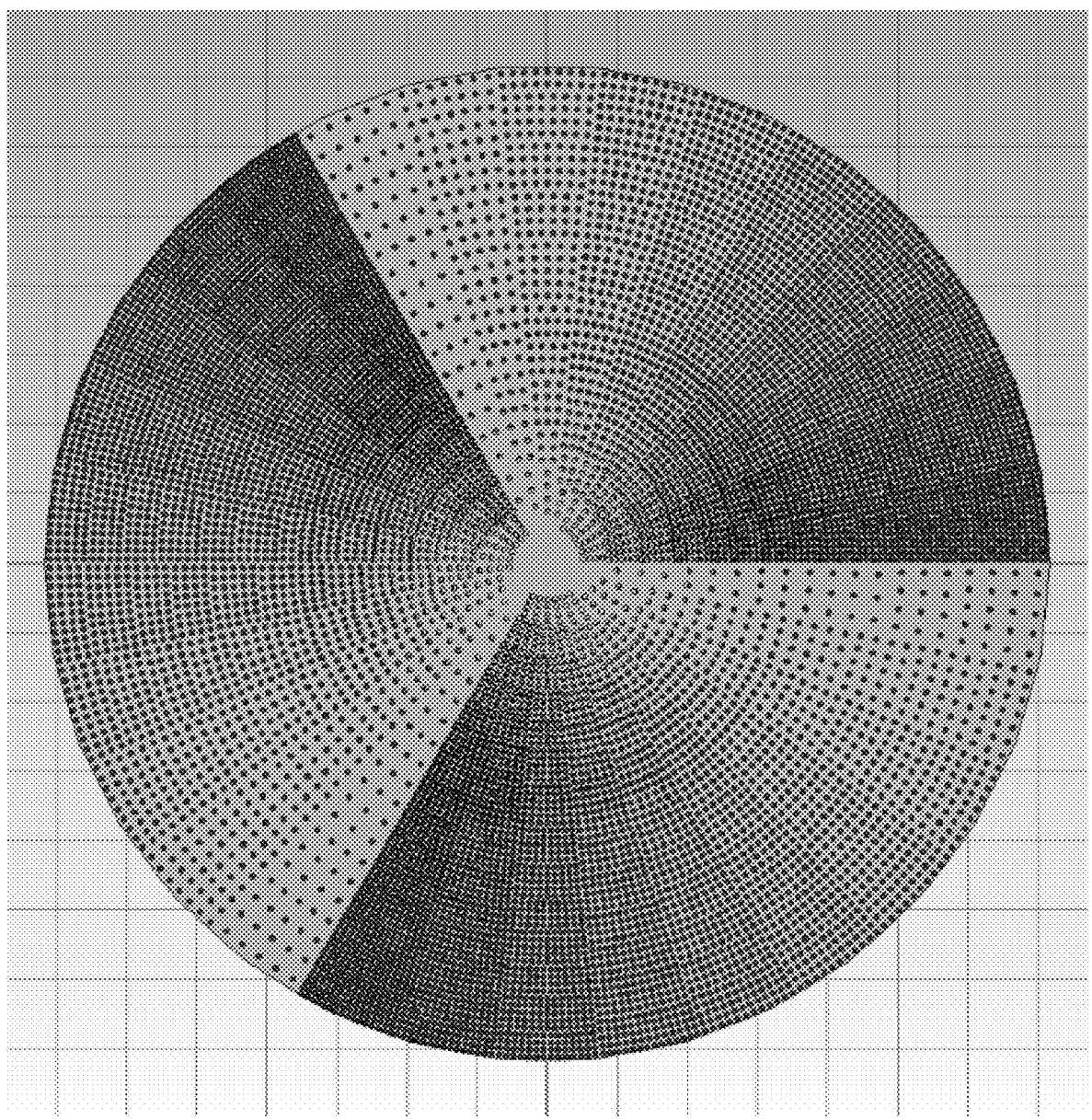
FIG. 10 depicts a triple mode, L=3, OAM FPP generated using iterative numerical circle packing methodology.
Figure 11:
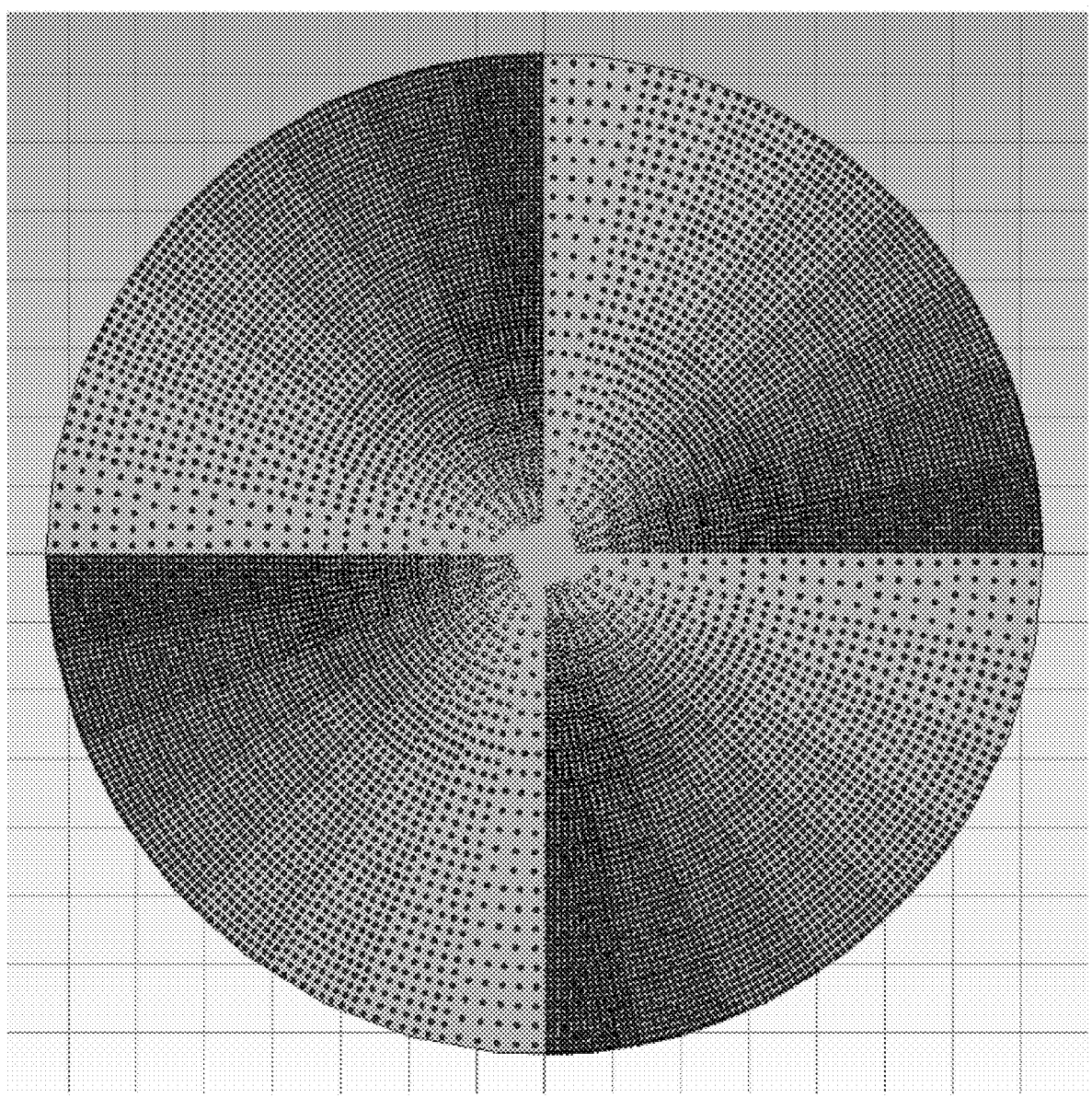
FIG. 11 depicts a quadruple mode, L=4, OAM FPP generated using iterative numerical circle packing methodology.

For mode $\ell$ =±1, 2π $\ell$ /n=10°, n=36 (FIG. 7 left)
For mode $\ell$ =±2, 2π $\ell$ /n=20°, n=36 (FIG. 7 right), and so on for $\ell$ =±3, $\ell$ =±4, . . . etc.
Again, the OAM modes contemplated above are single mode, diffractive OAM.

Microwave and millimeter wave frequencies for wireless secure high data rate transmission and reception. In millimeter wave application, the device will require metal oxides such as $Al_2O_3$, MgO, and $BaTiO_3$. A key factor in our approach is the development of wideband, bandwidth greater than 50%, OAM low loss highly efficient FPP. Firstly, we will design the component for generating wideband OAM modulation on a wireless signal and a wideband FPP to induce OAM modulation in the wireless signals.

The FPP of the present invention is designed to generate OAM modulated EM waves by drilling different densities of holes 17 in different sectors 12 to change the refractive index and thereby adjust the output phase. Generating mixed or hybrid OAM modes enables the exploitation of mutually orthogonal eigenstates.

Previously, Wang et al., demonstrated the use of four individual spiral phase plates to generate OAM beams with four different respective OAM modes and also utilized a non-polarizing beam-splitter to multiplex the OAM beams. In addition, antenna arrays have been used to generate inter-modulated OAM modes.

However, no research or reports yet exist that demonstrate the use of a single antenna to generate arbitrary mixed OAM modes. Implementing a series of planar OAM antennas based on transmit array antenna theory enables the creation of arbitrary single-mode and mixed-mode OAM waves, including without limitation mixed-mode OAM waves with two superimposed modes and three superimposed modes, which can be used to achieve orbital angular momentum multiplexing by using single antenna.

The FPP of the present invention has many advantages over existing components designed for OAM beam, including without limitation: 1) compact form factor, 2) inexpensive and easy manufacture and installation, 3) perfect impedance matching, 4) extremely wide bandwidth and non-resonant design, 5) no source blockage or off-axis feed problems, 6) no OAM phase distortion or noise, 7) no surface mode generation leading to pure OAM phase front, and 8) utility for generating non-diffracting OAM airy beams.

Regarding the compact form factor of the FPP disc of the present invention, the phase plate is flat on both sides, thinner, more compact, more lightweight, and easier to manufacture and install than other existing OAM components. In addition, the wide bandwidth of the FPP enables operation over a large frequency range, allowing a reduction in the number of required components and also supporting easier and less expensive manufacture.

The design of the FPP incorporates a slab of dielectric, magnetic, magneto-dielectric, metallo-magnetic, metallo-dielectric, metallo-dielectric-magnetic or metamaterial with holes drilled into it. The density of the holes is changed around the azimuth angle in a circle resulting in a slab with varying permittivity or permeability. This variation in the material parameter results in different phase shifts of the beam around the circle. For OAM L=1 the hole density is such that for one full rotation a $2\pi$ phase shift is introduced in the emitted beam. Similarly, for OAM L=±2 for two full rotations a $4\pi$ phase shift is introduced.

The FPP of the present invention integrates perfect impedance matching to minimize reflection losses, with impedance matched layers incorporated into the design of the FPP as top and bottom parts on either side of the dielectric, magnetic, magneto-dielectric, metallo-magnetic, metallo-dielectric, metallo-dielectric-magnetic or metamaterial slab.

First, the impedance matched FPP has a similar design as the central phase plate, but with different effective material parameters. Second, permeability and permittivity of the OAM FPP can be chosen to be the same resulting perfect impedance match with intrinsic impedance same as that of air resulting in extremely low return loss.

The FPP of the present invention is an extremely wideband device. The wide bandwidth for operation can be greater than 50%, as high as 20 GHz at 30 GHz operational frequency. Further, the non-resonant design of the device gives rise to its wide bandwidth, an important characteristic of high performance communication systems.

Producing a spiral OAM phase front with wide bandwidth has many advantages over previous approaches. Previously developed OAM modulators are based on resonant patches which have a limited BW of 3%. In comparison, our FPP has extremely wide bandwidth, allowing for its applications in cognitive software defined radios, and reconfigurable wideband architectures.

The FPP of the present invention also prevents source blockage and off-axis feed problems through the principles of its design. Because the FPP design is based on effective permittivity or permeability change and the design is a flat, disc shape, the incoming waves can be incident at any angle to produce the OAM modulated beam. In contrast, with thickness varied spiral phase plates of the prior art, all angle incidence of the prior art does not result in clean OAM modulation.

The FPP 10 of the present invention further prevents OAM phase distortion, again to due to flat shape and production of clean OAM signal output without noise. Furthermore, the FPP of the present invention also prevents the generation of surface modes, leading to creation of a pure OAM phase front. The dielectric, magnetic, magneto-dielectric, metallo-magnetic, metallo-dielectric, metallo-dielectric-magnetic or metamaterial planar disc receives the incoming signal and transmits it with OAM modulation. Whereas resonant element-based, multi-layer phase plates of the prior art inherently include generation of surface modes, resulting in distortion and noise of output OAM modulation.

The FPP 10 of the present invention can be utilized to generate non-diffracting OAM airy beam or non-diffracting OAM curved beams. Such non-diffracting curved beams bend in free air, which provides superior security and facilitates non line-of-sight communications. The emitted OAM beam can be made diffractive or non-diffractive depending upon the application requirement.

The emitted OAM beam can be made diffractive or non-diffractive depending upon the application requirement. The FPP in the far field (the incident EM wavefront is parallel to the planar surface of the wave plate) or a combination of directive lens and a FPP (the incident wavefront is spherical) will result in diffractive OAM modes. The FPP can also be utilized to generate non-diffractive OAM modes or higher order Bessel beams.

Figure 14:
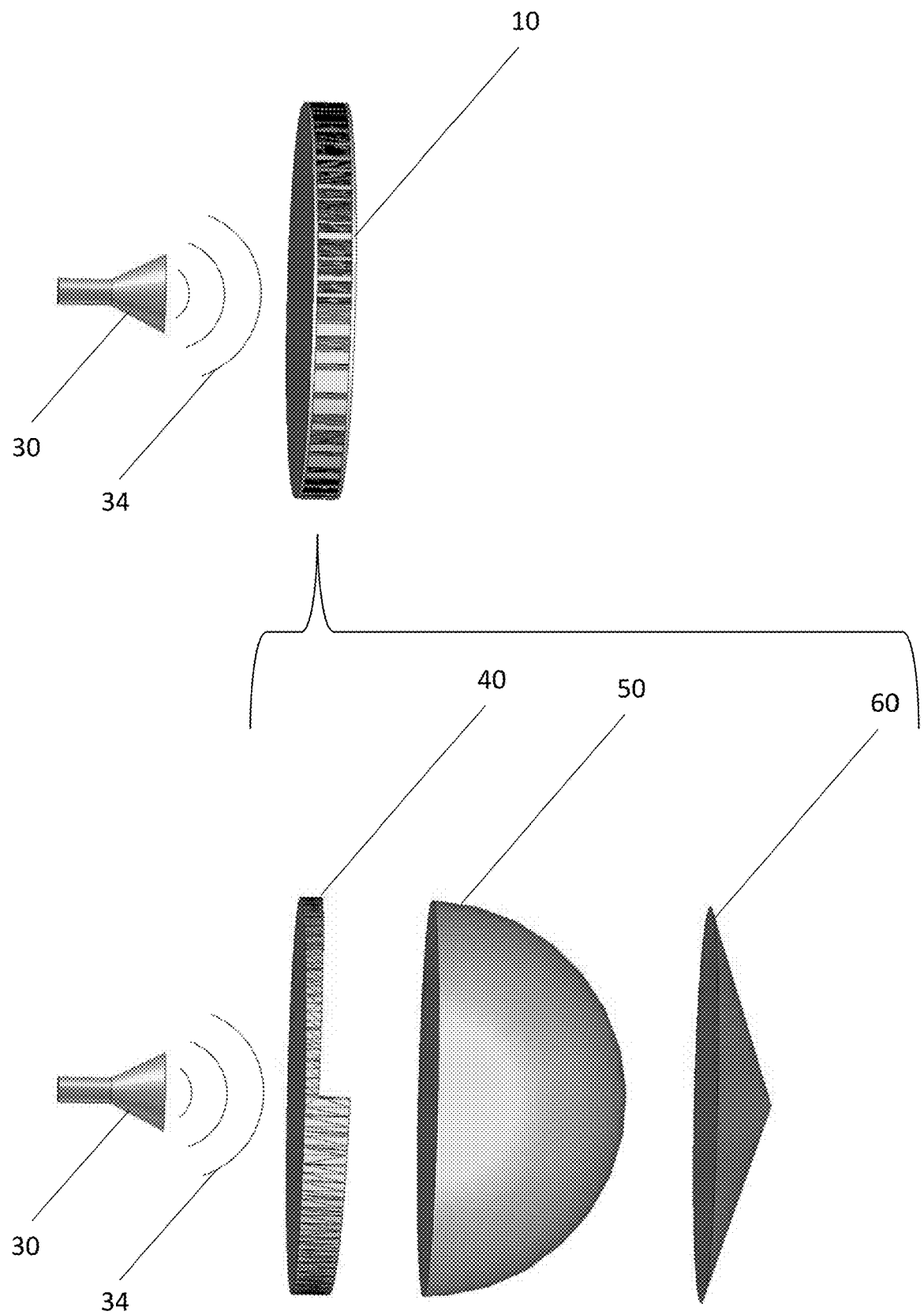
FIG. 14 depicts an embodiment of the spiral FPP of the present invention that is equivalent to a conventional spiral phase plate combined with a plano-convex lens and an axicon for generating non-diffracting Bessel beam OAM modes.
Figure 15:
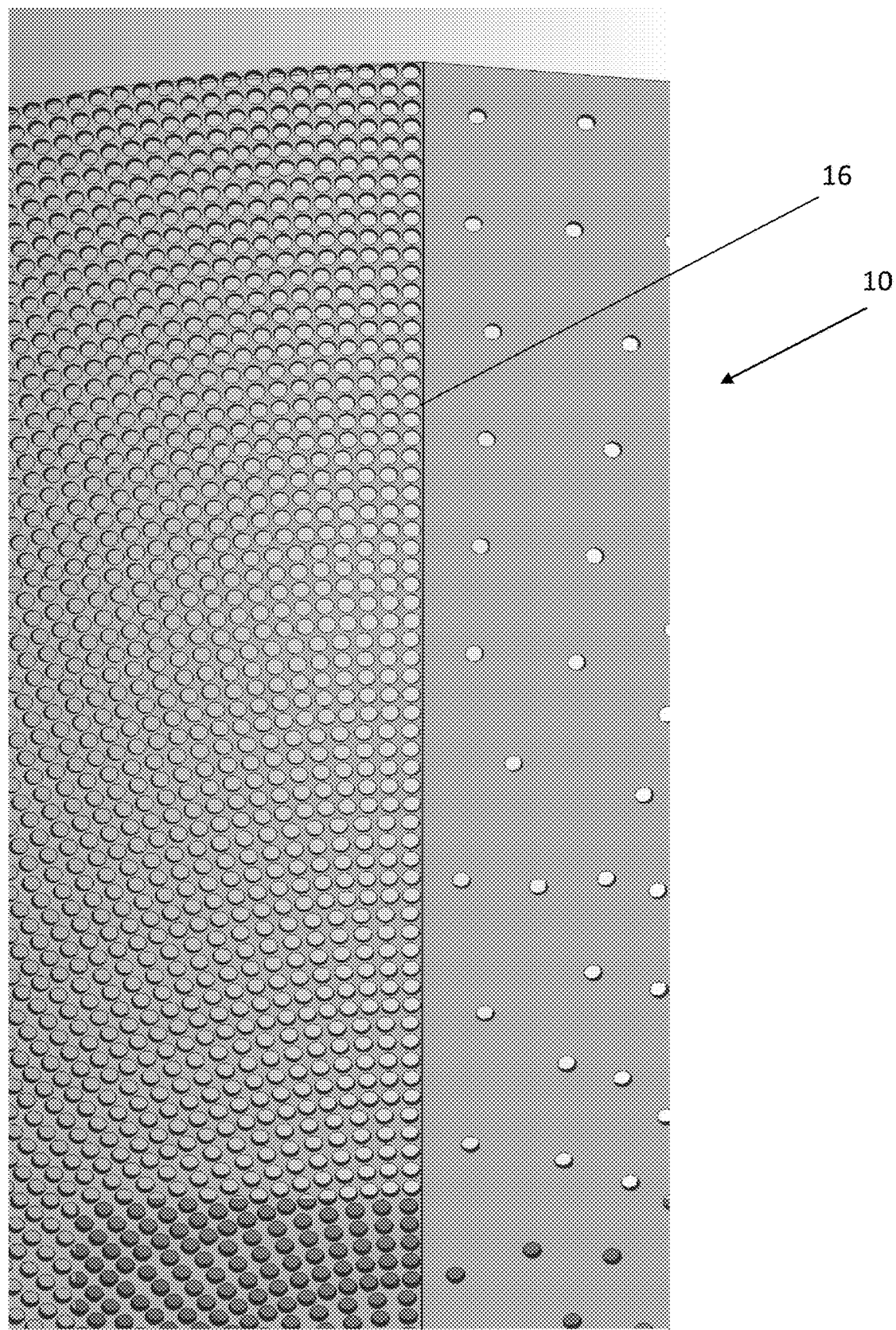
FIG. 15 depicts a close up view of the hole packing configurations near the line of discontinuity in the OAM FPP.

Usually, an axicon is used to get a zero or higher order Bessel beam. The property provided by an axicon can be integrated within a FPP by incorporating an appropriately configured array of holes or inclusions to achieve the required refractive index for a non-diffractive OAM beam. In such non-diffractive embodiments, the holes or inclusions may or may not be of uniform diameter. FIG. 14 shows that the FPP 10 can be considered equivalent to a combination of three components that are used to generate non-diffractive OAM beams, a spiral phase plate 40, a plano-convex lens 50 and an axicon 60.

FIG. 14 (as well as FIGS. 1, 4B and 7B) also depicts a horn antenna 30 producing a diverging Gaussian Beam EM wave 34 which impinges upon a spiral phase plate 40 having a height or thickness discontinuity, producing a vector vortex. Next the EM wave impinges upon a plano-convex lens 50 which produces a focused or less divergent pure vortex. And lastly, the EM wave then impinges upon an axicon 60, which produces a zeroth to higher-order quasi-non-diffracting Bessel Beam.

Other phase plate designs could also be used to generate zeroth order as well as higher order Bessel beams. The advantage of a Bessel beam lies in the non-diffracting (for short-range, a few times the size of the lens) and self-healing characteristic of it. Designs for such phase plates may be developed using Field transformation optics on one or more 3-D components to generate flat 2-D component having the same property.

Specifically, non-diffracting singular beams can travel along parabolic or curved trajectories in space. These curved non diffracting beams can be used for 1) securing OAM states based communications, 2) long distance communications due to non-diffracting nature, 3) non-line-of-sight wireless communications in crowded cityscapes with multiple buildings, and 4) military stealth communications due to, again, non-line-of-sight curved beams. The receiver, without prior knowledge, would not be able to determine the origin of the beams. Thus, military satellites, aircraft and other sea and land vehicles can be protected.

Government applications of interest include programs such as SIGINT, ISR, UAV and tactical ground vehicle communications. Commercial wireless systems of interest include mobile, LAN, television, radio, aircraft weather radars, GPS, telemetry, long range point-to-point communication systems in clutter building environment.

Beams carrying OAM have applications in a variety of fields such as secure high data rate free space military and commercial communications, high resolution tactical military and commercial weather and geographical radar imaging, big data of biomedical body worn vital sign monitoring sensors, and many other internet of the things (IoT) device to device and machine to machine data sharing applications, non-diffracting EM beams, cognitive software defined radios and reconfigurable wideband architectures, photon manipulation, RF tweezers, vortex knots and photon entanglement, spectroscopy, microscopy and coronography, quantum information processing and detection of rotating black holes.

It should be understood that, although specific embodiments have just been described, the claimed subject matter is not intended to be limited in scope to any particular embodiment or implementation. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter.

While certain features have been illustrated or described herein, many modifications, substitutions, changes, or equivalents may not occur to those skilled in the art. It is, therefore, to be understood that the appended claims are intended to cover all such modifications or changes as fall within the true spirit of the claimed subject matter.

What is claimed is:

1. A phase plate configured to generate orbital angular momentum in electromagnetic waves or beams over an operable frequency range, comprising:
    a planar portion of a base material having a base refractive index, a first surface and a second surface,
    wherein the base material includes at least one of a series of holes, or a series of inclusions formed within the base material,
    wherein the at least one of the series of holes or the series of inclusions have a dimension that is sub-wavelength with respect to the operable frequency range and the at least one of the series of holes or the series of inclusions are configured to implement a variation in the base refractive index, to provide a phase adjustment to an incident electromagnetic wave or beam within the operable frequency range and to create orbital angular momentum within the incident electromagnetic wave or beam; and
    two or more sectors, wherein an interspacing between the at least one of the series of holes or the series of inclusions within each sector is uniform,
    wherein the uniform interspacing between the at least one of the series of holes or the series of inclusions is different as between each sector,
    wherein each sector thereby provides a different phase adjustment to an incident electromagnetic wave or beam.

2. The phase plate of claim 1, wherein the base material is planar slab of one or more of a dielectric material, a magnetic material, a magneto-dielectric material, a metallo-magnetic material, a metallo-dielectric material, a metallo-dielectric-magnetic material and a metamaterial.

3. The phase plate of claim 2, wherein the planar slab comprises multiple sheets of one or more of a dielectric material, a magnetic material, a magneto-dielectric material, a metallo-magnetic material, a metallo-dielectric material, a metallo-dielectric-magnetic material and a metamaterial.

4. The phase plate of claim 1, wherein the series of holes comprise through holes that transect the base material from the first surface all the way through to the second surface.

5. The phase plate of claim 1, wherein the series of holes comprise blind holes that only penetrate the base material to a depth less than a full thickness of the planar portion and do not transect the base material from the first surface all the way through to the second surface.

6. The phase plate of claim 1, wherein the variation in the base refractive index follows a gradient around a center point within the planar portion.

7. The phase plate of claim 1, wherein the variation in the base refractive index follows one or more of a circular pattern gradient and a spiral pattern gradient around a center point within the planar portion.

8. The phase plate of claim 1, wherein the phase adjustment provided to the incident electromagnetic wave or beam creates one or more of a diffractive and a non-diffractive, single mode orbital angular momentum within electromagnetic wave or beam.

9. The phase plate of claim 1, wherein the phase adjustment provided to the incident electromagnetic wave or beam creates one or more of a diffractive and a non-diffractive, multi-mode orbital angular momentum within electromagnetic wave or beam.

10. The phase plate of claim 1, wherein the operable frequency range of the phase plate is within a range of one or more a few hundred KHz, radio frequencies, millimeter wave frequencies, microwave frequencies, visible frequencies and ultraviolet frequencies.

11. The phase plate of claim 1, wherein the at least one of the series of holes or the series of inclusions have a constant diameter.

12. The phase plate of claim 1, wherein the arrangement of the at least one of the series of holes or the series of inclusions is configured to provide the phase plate with perfect impedance matching to the air or free space.

13. The phase plate of claim 1, wherein the phase plate also includes one or more impedance matching layers and wherein the impedance matching layers comprise one or more of a top part affixed to the phase plate at the first surface and a bottom part affixed to the phase plate at the second surface.

14. The Phase plate of claim 13, wherein the one or more impedance matching layers may be one or more of interleaved sheets with holes and interleaved sheets without holes.

15. The phase plate of claim 14, wherein the top part and bottom part comprise one or more impedance matching layers.

16. The phase plate of claim 1, wherein the series of inclusions contained within the base material are selected from the group consisting of: air inclusions, dielectric inclusions, magnetic inclusions, metallic inclusions, magneto-dielectric, magneto-metallic, metamaterial inclusions, lower density base material infill inclusions and higher density base material infill inclusions.

17. The phase plate of claim 1, wherein the series of holes in each sector is filled with a material having a uniform concentration of magnetic particles and wherein the concentration of magnetic particles in the material filled into the series of holes is different in each of the sectors, whereby each sector thereby provides a different phase adjustments to an incident electromagnetic wave or beam.

18. A phase plate configured to generate orbital angular momentum in electromagnetic waves or beams over an operable frequency range, comprising:
  a planar portion of a base material having a base refractive index, a first surface and a second surface,
  wherein the base material includes at least one of a series of holes or a series of inclusions formed within the base material,
  wherein the at least one of the series of holes or the series of inclusions have a dimension that is sub-wavelength with respect to the operable frequency range and at least one of the series of holes or the series of inclusions are configured to implement a variation in the base refractive index, to provide a phase adjustment to an incident electromagnetic wave or beam within the operable frequency range and to create orbital angular momentum within the incident electromagnetic wave or beam; and
  two or more sectors, wherein the series of holes in each sector is filled with a material having a uniform concentration of magnetic particles and wherein the concentration of magnetic particles in the material filled into the series of holes is different in each of the sectors, and
  wherein each sector thereby provides a different phase adjustment to an incident electromagnetic wave or beam.

19. The phase plate of claim 18, wherein a density of the holes of the series of holes, or an interspacing between the series of holes, gradually increases within the base material in one or more of a clock-wise and counter-clock-wise direction around a center point within the planar portion.

20. The phase plate of claim 18, wherein a density of the inclusions, or an interspacing between the series of inclusions, gradually increases within the base material in one or more of a clock-wise and counter-clock-wise direction around a center point within the planar portion.

* * * * *